United States Patent [19]
Gross et al.

[11] Patent Number: 5,355,501
[45] Date of Patent: Oct. 11, 1994

[54] IDLE DETECTION SYSTEM

[75] Inventors: Roger A. Gross, Andover; John P. Constant, Harwell, both of United Kingdom

[73] Assignee: Novell, Inc., Provo, Utah

[21] Appl. No.: 491,211

[22] Filed: Mar. 9, 1990

[51] Int. Cl.[5] .................... G06F 15/00; G06F 11/30
[52] U.S. Cl. .................... 395/750; 364/707; 364/DIG. 1; 364/273; 364/273.1; 364/264; 364/264.2; 364/264.5
[58] Field of Search .................... 395/750, 700, 575; 364/707; 371/16.3

[56] References Cited
U.S. PATENT DOCUMENTS

| | | | |
|---|---|---|---|
| 4,293,927 | 10/1981 | Hoshii | 395/750 |
| 4,698,748 | 10/1987 | Juzswik et al. | 395/750 |
| 4,980,836 | 12/1990 | Carter et al. | 364/483 |
| 5,083,266 | 1/1992 | Watanabe | 395/275 |
| 5,142,684 | 8/1992 | Perry et al. | 395/750 |
| 5,218,704 | 6/1993 | Watts, Jr. et al. | 395/750 |

FOREIGN PATENT DOCUMENTS
2235797 3/1991 United Kingdom ......... G06F 1/320

OTHER PUBLICATIONS
WO 91/00566, PCT International Application, published Jan. 10, 1991, Poquet Computer Corp.
0364222, European Patent Application, published Apr. 18, 1990, Compaq Computer Corp.

*Primary Examiner*—Paul V. Kulik
*Attorney, Agent, or Firm*—Fliesler, Dubb, Meyer & Lovejoy

[57] ABSTRACT

A method and apparatus for idle detection in a computer system. The operating system of the computer includes an idle kernel which performs idle detection to detect idle states when application program processes are idle. To check for idle states, the idle kernel monitors operating system functions which are typically used by application programs when they are otherwise idle. The operating system includes an idle driver which controls idle operations in response to idle states detected by the idle monitor. The idle driver causes the system to enter the power saving mode with frequent, sometimes short idle intervals.

65 Claims, 5 Drawing Sheets

IDLE DETECTION SYSTEM

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to computers and particularly to methods and apparatus for idle detection and power saving in computers.

2. Description of the Related Art

The need for idle-detection arises when, for example, a computer or part thereof is to be slowed down or stopped in order to conserve power. The need to save power is particularly important in battery-operated computers in order to extend battery life. Portable computers are typically battery-operated and hence the need to save power is becoming increasingly important as the use of portable computers increases.

Power consumption is distributed among the major parts of a computer. One part of the computer with significant power consumption is the CPU. Other parts include each of the input/output (I/O) devices such as display screens, keyboards, modems, printers, disk drives and the like. Still another part with significant power consumption is memory.

Prior art attempts at conserving power have generally focused on a single part of the computer such as a particular one of the I/O devices.

For example, to save power for the screen display, systems have detected screen inactivity and employed screen blanking for an idle screen to reduce the power to the display screen when the screen has not been used for some period of time. Typically, a timeout circuit senses changes in screen information and, if no change has occurred for a predetermined timeout period, the backlight to the screen is turned off for power reduction. While screen blanking is effective in reducing power for the display screen, no reduction results in power to the driver circuitry for the display, to the CPU, or to other parts of the computer.

Other prior art attempts at conserving power consumption have focused on disk drives because the power consumption of rotating magnetic disks is high. Disk drive manufacturers have employed various schemes for reducing the power consumption of the disk drive. While such power consumption schemes are effective for the disk drive, no reduction results in power to the CPU or other parts of the computer.

Other attempts at conserving power have done so only when relatively long periods of idleness exist.

In order to reduce power consumption in computers, there is a need for improved idle detection methods and apparatus.

SUMMARY OF THE INVENTION

The present invention is a method and apparatus for idle detection in a computer system. The computer system typically includes as hardware a central processing unit (CPU), memory (M) and input/output (I/O) devices. The computer system additionally includes as software an operating system, DOS, and application programs (AP) that execute in the computer system under control of the operating system.

The operating system includes an idle kernel which performs idle detection to detect idle states when application program processes are idle. A process is idle while it is waiting for some event to occur, for example, an external event such as a keystroke, a mouse movement or a fixed amount of time to pass. To check for idle states, the idle kernel monitors operating system functions which are typically used by application programs when they are otherwise idle.

The operating system includes an idle driver which controls idle operations in response to idle states detected by the idle monitor. The idle driver can be stored in read-only memory (ROM) or otherwise in the system memory. The idle driver causes the system to enter the power saving mode with frequent, sometimes short idle intervals. The idle intervals, for example, can be as short as the time between events, such as between two keystrokes on a keyboard. Even though the idle intervals are at times short, the accumulated power savings of many short idle intervals is substantial. Substantial power saving occurs even when no long idle intervals exist. For example, a long idle interval is measured in multiple seconds or minutes.

The idle kernel and the idle driver use a common data region in memory to pass information about the current application process state and modify the action of the idle detection code.

The idle driver qualifies the idle status information received from the idle kernel. This qualification is done, for example, by checking for specific interrupts. The idle driver discriminates between an application program that is genuinely idle, for example when polling the keyboard in a tight loop, and an application program that is active but also polling the keyboard, for example when testing for an abort key to be pressed. This discrimination is achieved by monitoring the time taken to go idle. If the time is within a specified period, it is assumed that the program is idle polling in a tight loop for a key to be pressed. If the time is outside of the specified limit, then it is assumed that some processing has occurred in between polling the keyboard, and the idle driver does not go to the idle state but returns immediately to the active state.

A program is set to the idle condition when an idle state has been detected within the time period specified in a local idle variable.

In one embodiment, the local idle variable is dynamically calculated as a function of the performance of the computer system. If the local idle variable is IDLE_CNTDN, in one example, the initial value is dynamically calculated as follows:

$$IDLE\_CNTDN = (INT16\_TIME + RTC\_TIME) * IDLE\_MAX$$

where,

INT16_TIME is the time taken to perform a ROS INT16h function 1 (keyboard status check).

RTC_TIME is the time taken to perform a read of the real-time clock using the ROS INT1Ah function 2 (read real time clock).

While measurement of the combination of a real-time clock and interrupt times is one way of measuring performance, other measurements to set the idle variable IDLE_CNTDN are, of course, possible.

Since performance varies from computer to computer, a dynamically calculated value for IDLE_CNTDN results in improved performance of the idle detection system. The value is calculated during execution of a start-up sequence to determine an initial value and periodically during the execution of application programs to obtain updated values. Updated values are useful since, for example, application programs may filter INT16 and RTC calls and change their duration. The times are calculated, in the example given, by reading the timer I/O device at the start and end of the ROS calls, and calculating the elapsed time.

In accordance with the above summary, the present invention achieves the objective of providing an improved idle detection system.

The foregoing and other objects, features and advantages of the invention will be apparent from the following detailed description in conjunction with the drawings.

DETAILED DESCRIPTION

Figure 1:
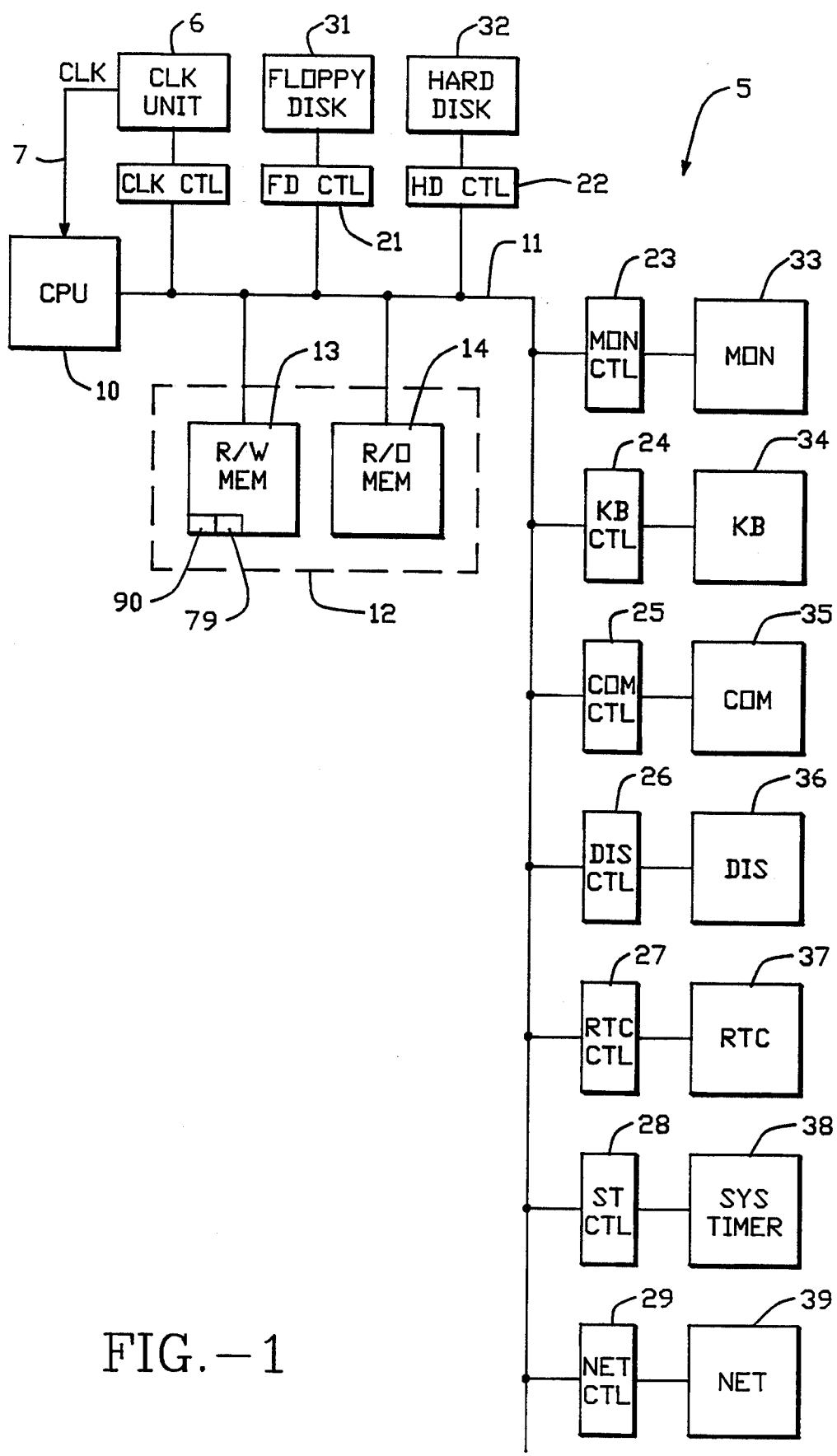
FIG. 1 depicts a block-diagram representation of a computer system with idle detection in accordance with the present invention.
Figure 2:
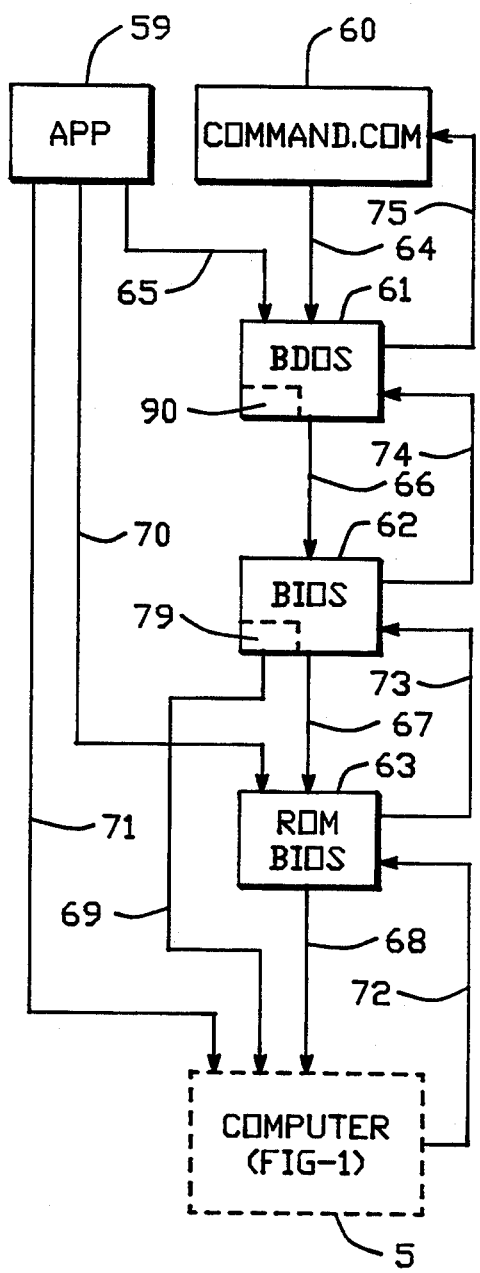
FIG. 2 depicts a block-diagram representation of the software for the computer of FIG. 1.

In FIG. 1, a computer system incorporating the idle detection system of the present invention is shown. The idle detection system is distributed throughout the hardware of the FIG. 1 computer and is stored in the software for the FIG. 1 computer as shown in FIG. 2. The software includes the idle kernel 90 and the idle driver 79, stored for example, all or in part in memory 13 and memory 14.

In FIG. 1, computer 5 includes a central processing unit (CPU) 10, an I/O bus 11, a memory 12 including read/write (R/W) memory 13 and read-only memory 14, and a plurality of I/O devices 30 and controllers therefor 20. The I/O devices 30 include a floppy disk 31 and controller 21, a hard disk 22 and controller 32, a monitor 33 and controller 23, a keyboard 34 and controller 24, a communication device (COM) 36 and controller 25, a display 36 and controller 26, a real time clock (RTC) 37 and controller 27, system timer 38 and controller 28, and a network device (NET) 39 and controller 29. While many of the I/O devices of FIG. 1 may not be present in any particular computer system which employs the present invention, such devices a common along with others not shown.

In FIG. 1, computer 5 also includes a clock unit 6 which provides the CLK signal to the CPU 10. The clock unit 6 is an I/O device which controls the ON and OFF state of and the frequency of the CLK signal on line 7 to the CPU 10. The clock signal is typically employed to control the refresh timing of dynamic memory and other components in a conventional computer 5.

In FIG. 2, a block-diagram representation of the software for the computer of FIG. 1 is shown. In FIG. 2, the software includes the operating system which typically includes as components COMMAND.COM 60, BDOS 61, BIOS 62 and ROM BIOS 63. In an IBM compatible computer, the components 60, 61, and 62 are the functional equivalent of the well-known COMMAND.COM, IBMDOS.COM, and the IBMBIOS.COM. The operating system thus configured, interacts with an application program 59 which together execute on the computer 5 of FIG. 1. In the present invention, the BDOS 61 includes an idle kernel 90 and the BIOS 62 includes an idle driver 79 which together with the rest of the system perform the idle detection of the present invention.

The general operation of the FIG. 1 and FIG. 2 system is well-known. Whenever computer 5 is rebooted, such as upon a power-off to power-on transition, path 72 sends a reboot signal to the ROM BIOS 63 which in turn sends a boot signal to BIOS 62, which in turn sends a boot signal to COMMAND.COM which then boots the system. Both COMMAND.COM 60 and application 59 execute in a conventional manner and call BDOS in the operating system by issuing an interrupt (specifically INT21). BDOS 61 in turn calls routines in the BIOS 62 which may in turn call the ROM BIOS 63 whenever an I/O operation is to occur. Calls to the ROM BIOS typically use interrupts INT10 and INT1F for IBM compatible computers. The BIOS 62 and/or the ROM BIOS 63 in turn control communication between the I/O controllers 20 and devices 30 of the computer 5 of FIG. 1.

Figure 3:
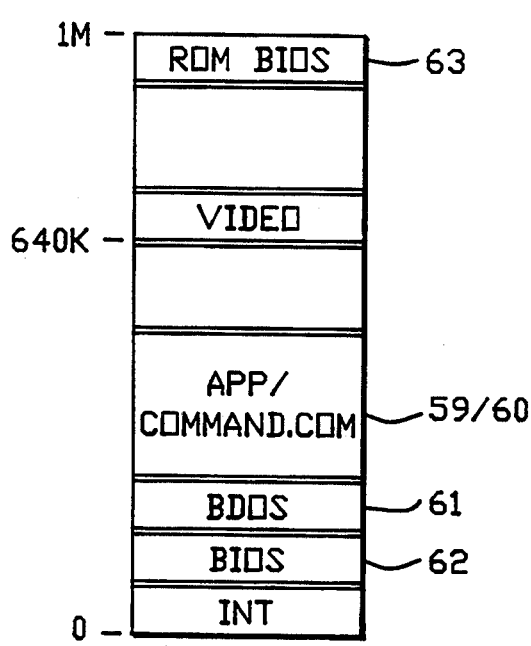
FIG. 3 depicts a block-diagram representation of one embodiment of the memory space of the computer system of FIG. 1 and FIG. 2.

In FIG. 3, the location in memory of the various software components is represented. Typically, the interrupt vectors are in the lowest address space. Next, in one embodiment, in order from lower to higher is the R/W portion of the BIOS 62 followed by BDOS 61 and APPLICATION 59 and COMMAND.COM 60 (APP/COMMAND.COM 59/60). The video memory typically is located above 640K and the ROM BIOS is located in the top-most 64K memory locations below 1M for a 1M address space.

Figure 4:
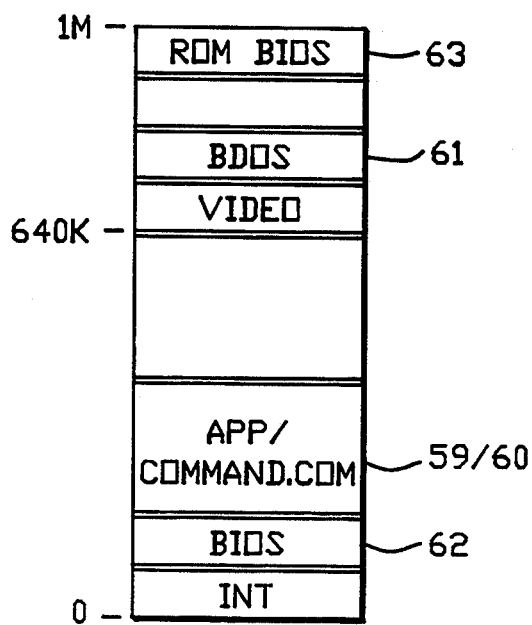
FIG. 4 depicts a block-diagram representation of another embodiment of the memory space of the computer system of FIG. 1 and FIG. 2.

In FIG. 4, the location in memory of the various software components is represented for an alternate embodiment. Again, the interrupt vectors are in the lowest address space. Next is BIOS 62 and APPLICATION 59 and COMMAND.COM 60 (APP/COMMAND.COM 59/60). The video memory is again located above 640K followed by the BDOS 61 including COMMAND.COM. The ROM BIOS is located in the top-most 64K below 1M for a 1M address space. Portions of the BIOS 62 can be stored in ROM.

Figure 5:
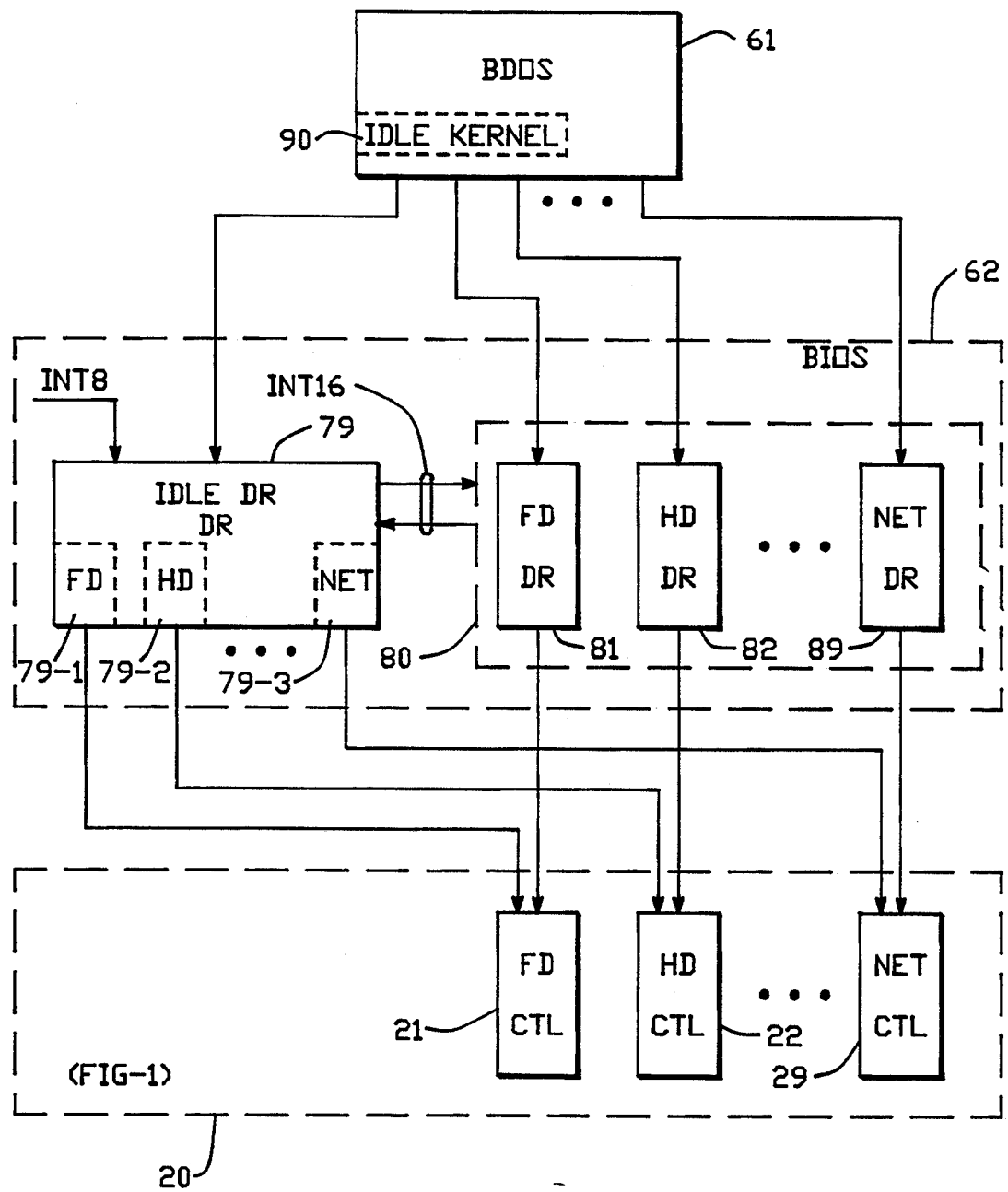
FIG. 5 depicts a block-diagram representation of the idle detection system software of the computer system of FIG. 1 and FIG. 2.

In FIG. 5, further details of the idle detection system of the computer system of FIG. 1 and FIG. 2 are shown. In FIG. 5, the BDOS 61 including the idle kernel 90 logically connects to the BIOS 62. BIOS 62 includes a plurality of drivers 80 including the drivers 81, 82 . . . , 89 corresponding to the controllers 21, 22, . . . , 29 of FIG. 1. Additionally, BIOS 62 includes an idle driver 79 which in turn may include components 79-1, 79-2, . . . , 79-9 corresponding to the controllers 21, 22, . . . , 29 of the FIG. 1 computer.

A detailed source code listing of the idle kernel 90, IKERNEL.ASM, which is employed in forming the BDOS 61 is given in LISTING 1 at the end of this specification.

A detailed source code listing of the idle driver 79 is given in LISTING 2 through LISTING 6 at the end of this specification. The idle device driver 79 of FIG. 5 is executable in the computer 5 of FIG. 1 in an object code form named IDLE86.SYS. IDLE86.SYS is formed by assembling and linking the source code idle driver IDLE86.SYS of LISTING 2 with the idle custom equates IDLE.EQU of LISTING 3, with the macro equates I:DRMACROS.EQU of LISTING 4, with the request header equates I:REQHDR.EQU of LISTING 5, with the device driver equates I:DRIVER.EQU of LISTING 6.

The object code program, IDLE86.OBJ, is formed by executing the make routine of TABLE 0 as follows.

TABLE 0

IDLE86.ASM: IDLE86.OBJ
    $(LINK) /map IDLE86.OBJ,$@;
IDLE86.OBJ: IDLE86.ASM IDLE.EQU I:DRAMACROS.EQU\
I:REQHDR.EQU I:DRIVER.EQU
    $(MASM) $(MASMFLG) -DDDRIVER $*,$@;

The idle driver 79 is hardware-dependent code loaded in the form of a character device driver which can be loaded dynamically using the CONFIG.SYS device statement. IDLE86.SYS is loaded, for example, by adding the following statement to the CONFIG.SYS file.

DEVICE=[path\]IDLE86.SYS[/V]

Idle Detection Overview

The idle detection kernel 90 of the BDOS 61 informs the idle driver 79 within the BIOS 62 when BDOS 61 interprets processes in the application program 59 to be idle. A process is idle while it is waiting for some event to occur, for example, an external event such as a keystroke, a mouse movement or a fixed amount of time to pass.

To check for idleness, the idle kernel 90 monitors the operating system (DOS) functions of TABLE 1 which are inactive functions typically used by application programs, such as program 59 of FIG. 2, when they are idle.

TABLE 1

| | |
|---|---|
| INT21/5Ch | Treat Lock/Unlock as inactive, some applications poll locked record. |
| INT21/44h | IO Control Treated as Inactive |
| INT21/0Bh | Console Status |
| INT21/0Ch | Flush and Invoke Treated as Inactive |
| INT21/19h | Get Current Disk |
| INT21/2Ah | Get Current Date |
| INT21/2Ch | Get Current Time |
| INT21/06h | Treat RAW_IO Status as Inactive |

IDLE State Data Area

When the idle driver 79 is loaded, DOS opens the driver 79 and, using an IO Control Write, passes the address of a common data area called the IDLE STATE DATA AREA. The device 79 is closed and the driver interface is never used again.

The IDLE STATE DATA AREA is used by both the kernel 90 in DOS and the idle device driver 79 to pass information about the current process state and modify the action of the idle detection code of kernel 90.

The address of this common data area is passed to the driver 79 at the end of the DOS initialization phase. The common data area is used by the idle kernel 90 to communicate process state information to the driver 79 and by the driver 79 to modify the kernel 90 idle detection routines. The process state information which can be passed is set forth in the following TABLE 2.

TABLE 2

| | | | |
|---|---|---|---|
| IDLE_STATE | RW | 0 | |
| IDLE_COUNT | DW | 0 | ; 0000h |
| IDLE_MAX | DW | 0 | ; 0002h |
| IDLE_FLAGS | DW | 10 | ; 0004h |
| IDLE_VEC | DD | 0 | ; 0006h |
| INT28_DELAY | DW | 0 | ; 000Ah |
| INT28_RELOAD | DW | 10 | ; 000Ch |
| IDLE_INDOS | DW | indos_flag | ; 000EH |
| RESERVED | DD | 0 | ; 0010h |

IDLE_COUNT

IDLE_COUNT is decremented every time an "IDLE" function call is made by the current DOS process (see table above). All other DOS function calls will reset IDLE_COUNT to IDLE_MAX. When IDLE_COUNT is decremented to 0, the BIOS 61 is called with the PROC-IDLE command.

IDLE_MAX

IDLE_MAX contains the number of consecutive idle function calls that must be made before the idle driver 79 within the BIOS 62 is called with the PROC_IDLE command. This value is initialized to 10 but can be modified by the driver to other values based on the performance of the host computer.

IDLE_FLAGS

The idle flags are set forth in the following TABLE 3.

TABLE 3

| | | | |
|---|---|---|---|
| IDLE_COMMAND | equ | 0001h | ; Command Processor Active |
| IDLE_DOSFUNC | equ | 0002h | ; DOS call made |
| IDLE_ON | equ | 4000h | ; ReSet when Idle Checking Enabled |
| IDLE_ENABLE | equ | 8000h | ; ReSet when $IDLE$ Loaded and Active |

IDLE_COMMAND is set whenever the current process is the command processor "COMMAND.COM". This bit is reset when a new application program 59 is loaded or the command processor is terminated. The information for this operation is derived from the history buffer select function.

IDLE_DOSFUNC is set whenever an active DOS function call is made. Therefore the BIOS can detect if an application which is polling the keyboard status, using the ROS, is also making any DOS calls. The $IDLE$ driver can reset this bit at any time.

IDLE_ON and IDLE_ENABLE enable the idle detection code of kernel 90. Only when both flags have been RESET will the idle detection code by enabled. The idle device driver 79 does not modify IDLE_ON.

IDLE_ENABLE is RESET by idle device driver 79 after IDLE_VEC has been initialized in order to enable the kernel 90 idle detection code. This bit can be SET by the device driver 79 if idle detection must be disabled for any reason.

IDLE_VEC

This double word pointer is initialized by the idle driver 79 to point to its handler routine which preserves all registers apart from AX and returns using the RETF instruction. The idle device driver 79 is called with the following command codes in the AX register. On entry, the DS register points to the segment of the IDLE State Data Area.

The BIOS IDLE Command Interface is set forth in the following TABLE 4.

TABLE 4

| PROC_IDLE | equ | 0001 | ; Process is IDLE |
|---|---|---|---|
| PROC_INT28 | equ | 0002 | ; INT28 Polling Loop |
| PROC_KEYIN | equ | 0003 | ; Keyboard Input |
| PROC_DEVIN | equ | 0004 | ; Device Input Routine |

PROC_IDLE command is executed when the kernel 90 has decided the current process is idling; that is, IDLE_MAX consecutive idle DOS function calls have been made. The $IDLE$ device driver 79 may now turn the computer 5 off until the next hardware interrupt occurs.

PROC_INT28 is executed when INT28_RELOAD consecutive INT28's have been made. The $IDLE$ device driver 79 may now turn the computer off until the next hardware interrupt occurs.

PROC_KEYIN is executed when a character is read from the console (CON) device and no character is ready. ES:BX points to the device header for the console. The $IDLE$ driver 79 can now turn the computer off until the next keyboard interrupt unless a TSR's or application is present which may require other interrupts to occur.

PROC_DEVIN is executed when a character is read from any device but the console and no character is ready. ES:BX points to the device header. If the device pointed to by ES:BX uses interrupts the $IDLE$ driver 79 can now turn the computer 5 off until a character is sent, unless a TSR's or application program 59 is present which may require other interrupts to occur.

INT28_DELAY

When INT28_DELAY is decremented to zero, INT28_RELOAD consecutive INT28's have been executed and the $IDLE$ device driver is called with the PROC_INT28 command.

INT28_RELOAD

INT28_RELOAD contains the number of consecutive INT28's that must be called before the PROC_INT28 command is called.

RESERVED

This double word is reserved as scratch space of the $IDLE$ driver 79. The first word entry is used by example $IDLE$ device driver for the variable IDLE_CNTDN.

Device Driver

The device driver 79 contains all the hardware-dependent code to support DOS idle detection. It can either be linked into the BIOS.SYS file of BIOS 62 or loaded dynamically. It supports the four device functions set forth in the following TABLE 5.

TABLE 5

| CMD_INIT | equ | 0 | ; Initialize Driver |
|---|---|---|---|
| CMD_OUTPUT_IOCTL | equ | 12 | ; IOCTL output |
| CMD_DEVICE_OPEN | equ | 13 | ; Device OPEN |
| CMD_DEVICE_CLOSE | equ | 14 | ; Device CLOSE |

The CMD-OUTPUT_IOCTL is called to transfer 4 bytes, this is a DWORD pointer to the IDLE State data area. The device driver then initializes the IDLE_VEC to point to the handling routine and then resets the IDLE_ENABLE bit in IDLE_FLAGS.

The $IDLE$ device driver 79 must also monitor any hardware specific status functions that an application program may monitor. Using this information, hardware assistance and the state information, the $IDLE$ device driver 79 turns the system off when the application is not making any DOS calls.

The /V option forces IDLE86.SYS to display real time idle status information on the video monitor. When enabled as a result of an idle sleep function, the first two characters in the top left corner of the screen are incremented to indicate that the idle driver is active. Column 1 row 1 is incremented each time the idle driver is about to put the CPU 10 to sleep to be awakened on any interrupt. Column 2 row 1, is incremented each time the idle driver 79 is about to be put to sleep waiting for a keyboard event. On the right hand side at the top of the screen, a 4 digit hex value is displayed indicating how long it took to come to the decision to go idle. This value is displayed in units of 1/65,353rds of an INT8 timer tick.

The IDLE86.SYS device driver will switch performance states, for example will enter the power saving mode in the embodiment described, in the following circumstances.

1) When the DOS kernel calls through the IDLE_VEC.

2) When the IDLE86.SYS device driver finds an application polling the hardware using ROS functions without making any DOS operating system calls.

3) An application reads a character from the keyboard directly using a ROS function.

Before switching performance states by entering the power saving mode, IDLE86.SYS monitors any available information to detect if the application is accessing other components in the system; for example, polling a serial port or updating a graphics screen. If such accessing exists, the device driver returns to the active state immediately and does not switch performance states and does not enter the power saving mode.

The idle driver 79 is able to make the distinction between a program that is genuinely idle, for example one that is polling the keyboard in a tight loop, and one that is active but also polling the keyboard testing for an abort key to be pressed. This distinction is achieved by monitoring the time taken to go idle. If the time is within a specified period as determined by a preestablished parameter, it is assumed that the program is idle, for example polling in a tight loop for a key to be pressed. If the time is outside of the specified limit and therefore differs from the parameter, then it is assumed that some processing has occurred in between polling the keyboard, and the driver should not switch performance states to an idle mode or power-saving state but should return immediately as active state.

It is assumed that a program is idle when an idle state has been detected within the event parameter established by the time period specified in the local variable IDLE_CNTDN. The initial value for this event parameter variable is calculated by the following Eq. (1):

$$IDLE\_CNTDN = (INT16\_TIME + RTC\_TIME) * IDLE\_MAX \qquad Eq. (1)$$

where,

INT16_TIME is the time taken to perform a ROS INT16h function 1 (keyboard status check).

RTC_TIME is the time taken to perform a read of the real-time clock using the ROS INT1Ah function 2 (read real time clock).

Since performance varies from computer to computer, it is not possible to give a static figure for IDLE_CNTDN, therefore the value is calculated during execution of the CMD_OUTPUT_IOCTL function. The times are calculated by reading the 8253 timer chip in the system timer 38 of FIG. 1 at the start and end of the ROS calls, and calculating the elapsed time. Since some TSR keyboard enhancement programs may load and take over the ROS keyboard handler after the $IDLE$ driver 79 has loaded, the $IDLE$ driver dynamically detects if this occurs and recalculates IDLE_CNTDN by repeating the test performed during the CMD_OUTPUT_IOCTL function.

The event parameter established by IDLE_CNTDN is compared with the event frequency as determined by the idle kernel 90 and if they differ, the performance state of the computer is switched, that is, the computer goes to sleep into a power-saving mode.

Having decided to switch into a power saving mode, the driver must determine what event will reswitch the system back to a fully active mode. The reswitch condition in general will be any event that is inconsistent with idleness.

If the current application program or a TSR has taken over the timer interrupt in order to "steal" processor time, the system must be "Powered Up" at the next timer interrupt.

Operation With Application Program

Figure 6:
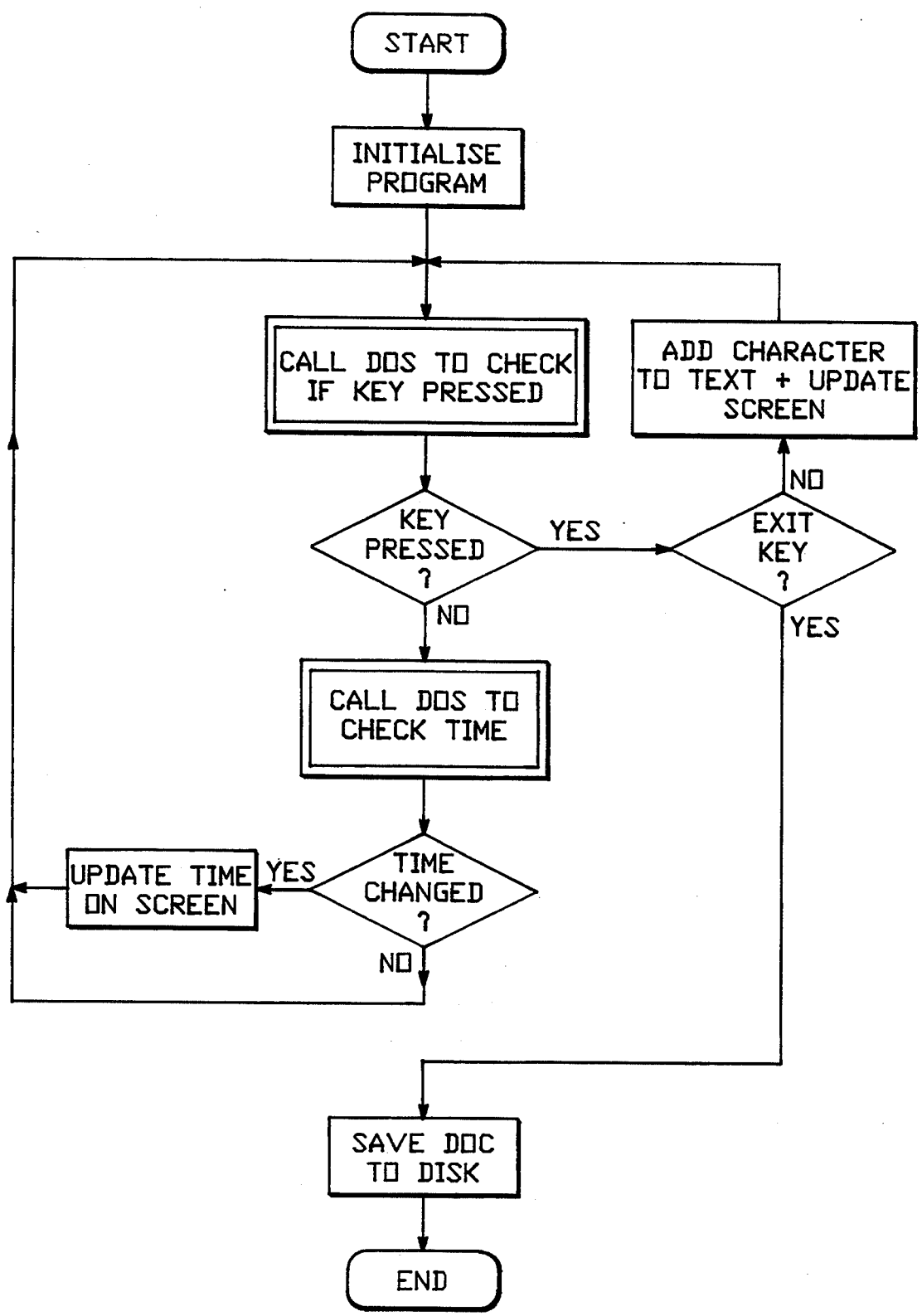
FIG. 6 depicts a block-diagram representation of a text editor application program which executes with the idle detection system of the present invention.
Figure 7:
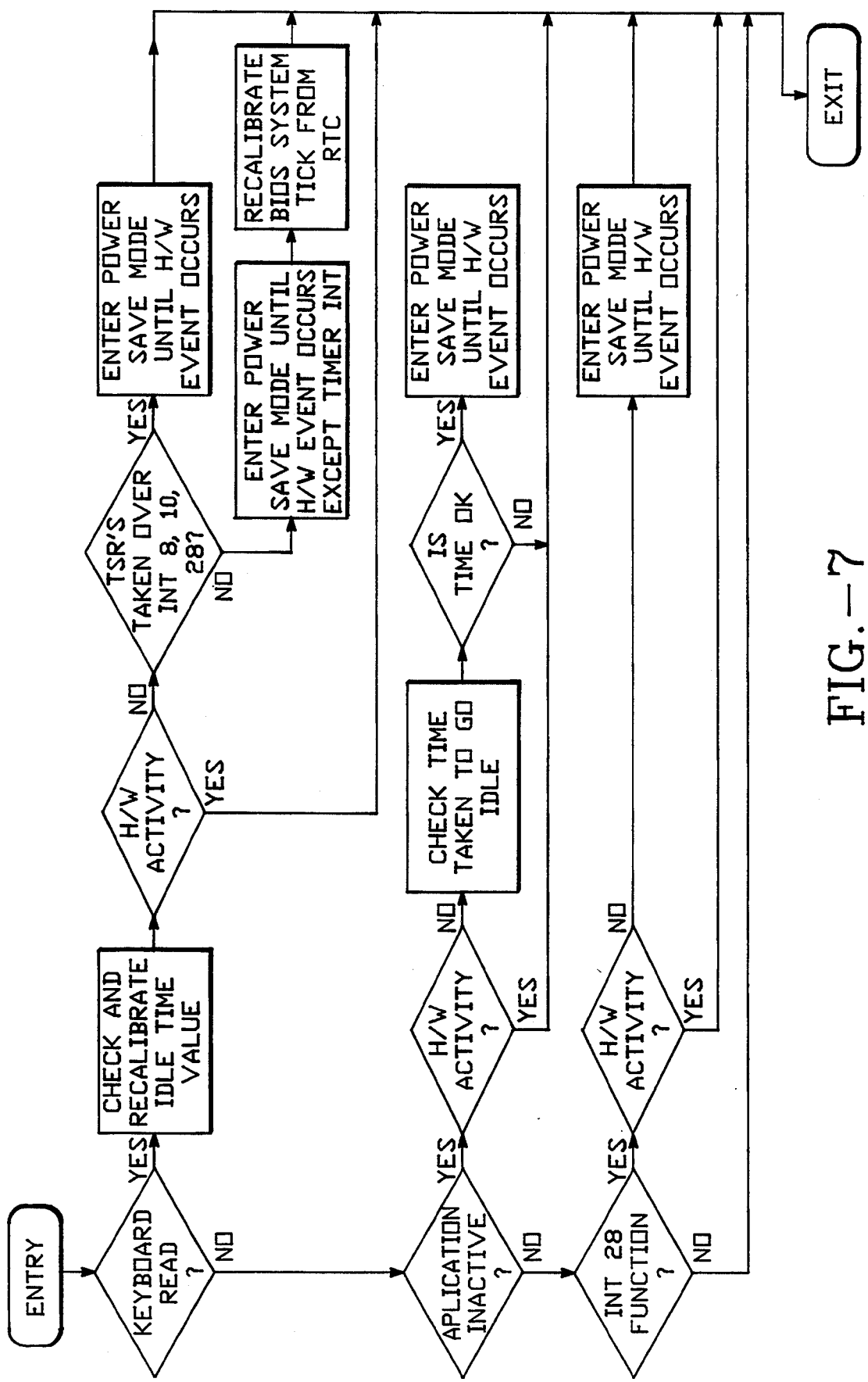
FIG. 7 depicts a flow-chart representation of the operation of the computer system during the execution of the text editor application program of FIG. 6.

As an example of the operation, the computer of FIG. 1 employs the CPU 10, R/W (RAM) memory 13, keyboard 34, real time clock 37 and a CRT display 36 in order to execute a text editor application program represented by FIG. 6. The power saving circuitry in the form of clock unit 6 of FIG. 1, in one example, controls the frequency of the CPU clock, CLK, thereby controlling the rate at which the CPU 10 operates. The clock unit 6 communicates with the idle detection programs to slow down or speed up the CPU clock speed. A slower CPU consumes less power than a fast CPU.

The text editor of FIG. 6 is the application program 59 of FIG. 4 that the computer 5 is running. The operation of the program of FIG. 6 is similar to any word processor application program and serves as a good example for explaining the present invention. When a key on keyboard 34 is pressed, the operating system software translates the electronic signals for that event from the keyboard into a text character that can be displayed onto a computer screen of display 36 or stored in a disk file of disk 31 or 32. Because a typist may enter keystrokes while the computer program 59 is busy performing another task, a "buffer" or portion of the computer 5 memory 13, is set aside to store the incoming keystrokes so that they are ready for use later on.

Thus in the example, when the editor is able to process a keystroke, the buffer is checked to see if a character is available. As the flowchart in FIG. 6 indicates, when a keystroke is available, it is removed from the buffer and inserted into the document text which is also stored in a buffer, and then copied to the screen of display 36 so that the operator can see the character typed. If a keystroke is not made, then the editor effectively has nothing to do, so typically such programs take this opportunity to read the time of day, using the Operating System Software, and display the time on the screen.

The clock 37 in computer 5 has a very fine resolution, that is to say, the clock keeps track of the time of day not just in units of seconds but in fractions of a second. Since the operator is only interested in knowing the time to the nearest second or minute, the time is not redrawn on the screen with the same resolution as the time changes internally in computer 5. Due to the speed at which a computer program executes instructions, the editor loops (waiting for a keystroke event) many hundreds of times before a keystroke event is presented for processing.

With a typist who enters keystrokes at the rate of 180 characters (45 words) a minute, a character is presented every ⅓rd of a second or every 333 msecs (milliseconds). The idle detection system, and particularly the idle kernel 90, detects a possible idle state after IDLE_MAX inactive loops of the program by monitoring the number of times that the operating system is called and the type of call that is made. The idle detection driver then checks the display 36 to determine if there was any activity that would suggest that the application program 59 was not idle. In the event that there is no activity, the idle system causes the computer 5 to enter power save mode by either issuing a power save command to the clock unit 6 to reduce the CPU clock speed and/or halt the computer thus reducing the power consumption of the computer 5.

The idle detection driver 79 then resets its internal status information so that a future idle state can be detected and then returns control to the editor application which continues to be executed, all be it at a vastly reduced speed. This reduced speed is quite satisfactory since the program has nothing to do in any case. The idle driver continues to monitor the keyboard and screen waiting for interrupts to occur that would require the CPU to quickly service the event, and therefore, return to full speed and full power consumption.

If suddenly the operator pressed a key that caused an interrupt to be generated, the idle driver detects the interrupt and the CPU is switched back to full power mode automatically. The interrupt is serviced and the keystroke placed into the keyboard buffer, then control is returned to the interrupted editor application. The next time the editor checked the keyboard status as a part of its program loop, it would detect a key-stroke, read the key code from the buffer and process the key code. The editors program loop would then once again check the time to see if it required and then pole the keyboard again waiting for another keystroke and so on and so forth. Eventually, the power save mode is reentered since the idle detection driver again detects inactivity. The CPU clock speed is slowed down and speeded up for short periods of time very often. These short but frequent periods of "rest" or idleness accumulate into considerable power saving even when long periods of idleness do not occur.

Program Execution

Further details of the operation will be apparent in the following LISTING 1, LISTING 2, ..., LISTING 6.

Through execution of the program routines, the idle detection kernel 90 of LISTING 1 informs the device driver 79 when kernel 90 interprets processes in the application program 59 to be idle. A process is idle while it is waiting for some event to occur, for example, an INT21 inactive event of TABLE 1.

In LISTING 1, the monitoring for the TABLE 1 inactive INT21 events occurs in lines L1-238 through L1-253 in the "int21 func" routine. An inactive event detected in L1-258 through L1-263 will jump to L1-254, L1-255 and to L1-303 to the "inactive" routine. In L1-306, the active_cnt value is decremented and tested for zero. If non-zero the process returns and waits for another inactive event detection of the TABLE 1 type. Monitoring for inactive events in this manner continues until the active_cnt goes to zero. When zero, the routine in L1-309, L-310 resets the active_cnt to idle_max parameter and calls the idle driver 79. The call is made in L1-315 by calling the idle_vec vector after setting the process idle by setting PROC_IDLE in L1-314.

In L1-258 to L1-260, an active event resets the active count active_cnt to idle_max.

The idle kernel 90 in monitoring for INT21 inactive events therefore includes monitoring means for monitoring event frequency, by decrementing active_cnt, during the execution of the application and other programs by the computer system 5.

The idle kernel 90 does not check every aspect of an application program's operation and therefore the idle driver 79 operates to qualify the idle status information passed by the kernel 90 to the device driver 79. This qualification is done by checking for specific interrupts and using other information about hardware, for example, video monitor operation. In the case of hardware detection with a video monitor, the idle driver 79 reads a data latch to determine if the application is using the video memory. This latch is set whenever the video memory is selected by the CPU.

The idle kernel 90 can call the idle driver in other cases, also. Particularly, when the kernel 90 detects a background application in an INT 28h idle loop, PROC_INT28 is set in L1-363 and the idle driver is called in L1-364 using idle_vec. When the kernel 90 detects a background application waiting for a keyboard event, PROC_KEYIN is set in L1-105 and the idle driver is called in L1-110 using idle_vec after a test in L1-106 and jump in L1-107. When the keneral 90 detects a background application waiting for a device input event, PROC_DEVIN is set in L1-108 and the idle driver is called in L1-110 using idle_vec.

The IDLE86.SYS device driver of LISTING 2 will switch performance states, for example will enter the power saving mode in the embodiment described, in the following circumstances.

1) When the DOS kernel calls through the "idle_vec", that is, L1-110, L1-315, and L1-364.

2) When the IDLE86.SYS device driver finds an application polling the hardware using ROS functions without making any DOS operating system calls.

3) An application reads a character from the keyboard directly using a ROS function.

In LISTING 2, the driver is called by the kernel 90 vector accessed from the dword of the data area in L2-165 which calls idle detect in L2-166. In L2-352, the idle_detect routine begins and examines for the PROC_IDLE, PROC_INT28, PROC_KEYIN, and PROC_DEVIN cases.

Before switching performance states by entering the power saving mode, IDLE86.SYS monitors any available information to detect if the application is accessing other components in the system. For example, THE PROC_IDLE case calls the WAIT_IDLE routine of L2-536 and checks for the polling of a serial port or updating a graphics screen in L2-537 by calling the routine at L2-628. If such accessing exists, the device driver 79 returns to the active state immediately in L2-634 and does not switch performance states and does not enter the power saving mode.

If no activity is found, the processing returns to the wait_idle routine L2-538 for further processing.

The idle driver 79 is able to make the distinction between a program that is genuinely idle, for example one that is polling the keyboard in a tight loop, and one that is active but also polling the keyboard testing for an abort key to be pressed. This distinction is achieved by monitoring the time taken to go idle by calling the chk_time routine in L2-543 appearing at L2-574. If the time is within a specified period as determined by a preestablished parameter, it is assumed that the program is idle, for example polling in a tight loop for a key to be pressed. If the time is outside of the specified limit and therefore differs from the parameter, then it is assumed that some processing has occurred in between polling the keyboard, and the driver should not switch performance states to an idle mode or power-saving state but should return immediately as active state.

It is assumed that a program is idle when an idle state has been detected within the event parameter established by the time period specified in the local variable IDLE_CNTDN. The value for this event parameter variable is calculated by the calc_idlecntdn routine at line L2-941.

The event parameter established by IDLE_CNTDN is compared with the event frequency as determined by the idle kernel 90 in L2-599 and if not exceeded, the performance state of the computer is switched, that is, the computer goes to sleep into a power-saving mode by the jump at L2-545 in the wait_idle routine. If the time to idle has been too long, the return from chk_time at L2-606 will cause the jump on condition at L2-544 to bypass L2-545 and hence will not jump to go_to_sleep.

Having decided to switch into a power saving mode, the driver must determine what event will reswitch the system back to a fully active mode. The reswitch condition in general will be any event that is inconsistent with idleness.

The foregoing and other objects, features and advantages of the invention will be further apparent from the following detailed embodiment setforth in TABLE 1, TABLE 2, ..., TABLE 6.

LISTING 1

```
;;****************************************************;
;----------------------------------------------------;
NAME: IKERNEL.ASM
;----------------------------------------------------;
; Copyright (C) 1990 Digital Research Inc.  All rights reserved.
;----------------------------------------------------;

;; From pcmode.equ

IDLE_DETECT                     ; Check for IDLE Process's if IDLE_DETECT
IDLE_COMMAND    equ     0001h   ; Command Processor Active
IDLE_DOSFUNC    equ     0002h   ; DOS Function Called
IDLE_INT28      equ     0004h   ; INT28 Called IDLE_ON         equ     4000h   ; ReSet when Idle Checking Enabled
IDLE_INIT       equ     8000h   ; ReSet when $IDLE$ Loaded and Active
IDLE_ENABLE     equ     IDLE_INIT + IDLE_ON PROC_IDLE   equ   0001          ; Process is IDLE
PROC_INT28  equ   0002          ; INT28 Polling Loop
PROC_KEYIN  equ   0003          ; Keyboard Input
PROC_DEVIN  equ   0004          ; Device Input Routine
endif ;;----------------------------------------------------
;; from data.pcm if IDLE_DETECT
;
; Concurrent DOS specific state information which must be saved when
; the INDOS_FLAG is 0 and an application needs to save the SYSTEM State.
;
   Public   idle_data
   Public   active_cnt, idle_max
```

```
    Public   idle_flags, idle_vec idle_data  rw 0            ; Idle State Data Area
active_cnt dw 0            ; InActive Function Count
idle_max   dw 10           ; Max No. of consecutive funcs.
idle_flags dw IDLE_INIT    ; $IDLE$ Has not been loaded
idle_vec   rd 1            ; DWORD pointer to IDLE handler Public   int28_delay, int28_reload
int28_delay  dw 0          ; No. Consecutive INT28's
int28_reload dw 10         ; INT28 Delay Reload Value
    dw indos_flag          ; Offset of INDOS_FLAG
    rw 2                   ; 2 OEM Reserved Words
endif
;;------------------------------------------------------------
;; from cio.pcm
;
;The COOKED and RAW Read functions are basically the same except
;in their treatment of Control-C. The RAW function returns this to
;the calling routine in AL whilst the COOKED routine causes a
;Control Break Interrupt (INT23)
;
   Public   cooked_read
cooked_read:
  push  ds
  call  get_dseg
cooked_r5:
   call  break_check        ; Check for a Control-C at CON_DEV
   call  char_check         ; Check for a character at the
   jz cooked_r8                 ; requested handle.
if IDLE_DETECT              ; Waiting for a device to become
   call  idle_dev               ; ready. So call IDLE routines to
endif                           ; put the processor to sleep.
  jmps  cooked_r5 cooked_r8:
   call  char_get           ; Get the RAW character from the
   cmp   al,CTLC                ; device driver, Check for CNTRLC
   jz go_int23                  ; and terminate the function if TRUE
```

```
    cmp     al,CTLP                  ; Check for Control P and toggle
    jnz     cooked_r10               ; the printer echo status and fetch
    xor     cio_state,CIO_CTLP       ; another character.
    call    open_or_close_prn
    jmps    cooked_r5
cooked_r10:
    pop     ds
    ret raw_read:
    call    char_check               ; Is there a character Ready
    jz      char_get                 ; Ready so return the character
if IDLE_DETECT                       ; Waiting for a device to become
    call    idle_dev                 ; ready. So call IDLE routines to
endif                                ; put the processor to sleep.
    jmps    raw_read                 ; NO so loop if IDLE_DETECT ; IDLE_DEV is called when the PCMODE is waiting for a character.
; This routine determines if the request is for a device or not
; and call the IDLE interface for device requests to the system can
; be put to sleep until a character is ready.
; On Entry:- BX Handle Number
;
idle_dev:
    test    idle_flags,IDLE_ENABLE   ; Has Idle Checking been enabled
    jnz     idle_d50                 ; Skip if NO.
    call    Is_device                ; requested handle a file or device
    jz      idle_d50                 ; File Access skip IDLE push es ! push bx
    mov     bx,ax                    ; Get the Device driver Address
    les     bx,dword ptr [bx]        ; from the local variable
    mov     ax,PROC_KEYIN            ; Assume this is the REAL Console
    test    DH_ATTRIB[bx],DA_ISCIN   ; Test Attribute Bits
    jnz     idle_d10                 ; Yes this is Default Console Device
    mov     ax,PROC_DEVIN            ; Input from Another Device
idle_d10:
```

```
        callf idle_vec              ; Call the IDLE Handler
        pop bx ! pop es idle_d50:
    ret
endif if IDLE_DETECT
    extrn idle_flags:word           ; IDLE State Flags
    extrn idle_vec:dword            ; IDLE routine Vector
endif ;;----------------------------------------------------------
;; from pcmif.pcm
;
; ++++++++++++++++++++++++++
; INT21 - Function Request
; ++++++++++++++++++++++++++
;
    Public   int21_entry
int21_entry:
    sti ! cld                       ; Enable interrupts and Clear
                                    ; the direction flag
    PUSH$DOS                        ; Save User Registers
    push bx ! push ds               ; Save USER DS and BX
    call  get_dseg                  ; Get the PCMODE Data Segment ;
; The following routines execute on the users stack without
; modifing the INDOS_FLAG etc. These routines only read
; or update BASIC system variables.
;
    cmp ah,33h ! jz  int21_e10      ; Func 33h - Control Break
    cmp ah,50h ! jb  int21_e20      ; Func 50h - Set PSP
    cmp ah,51h ! jbe int21_e10      ; Func 51h - Get PSP
    cmp ah,59h ! jz  int21_e10      ; Func 59h - Return Extended Error
    cmp ah,62h ! jnz int21_e20      ; Func 62h - Get PSP
```

```
int21_e10:
    mov     bp,sp                       ; Calculate Stack Frame address
    add     bp,4                        ; and initialise BP correctly mov     dos_FMASK,0                 ; Initial dos_FMASK
    mov     dos_FLAGS,0                 ; Initial dos_FLAGS xchg    al,ah ! cbw                 ; Generate the function offset
    mov     bx,ax ! shl bx,1            ; in the internal table call    pcmode_ft[bx]               ; Execute the function
    mov     ax,dos_FLAGS                ; POP dos_FLAGS into AX
    mov     cx,dos_FMASK                ; POP dos_FMASK into BX
    mov     sp,bp                       ; Correct the Stack Pointer and
    jmp     f4C_e10                     ; use common code to save space
int21_e20:
    cli
    inc     indos_flag                  ; Increment the INDOS Flag
    mov     int28_flag,TRUE             ; Generate INT28s
if IDLE_DETECT
    mov     bx,int28_reload             ; Reset the INT28 delay counter
    mov     int28_delay,bx              ; with the Reload value
endif
    mov     bx,offset indos_stack       ; Use the "INDOS" Stack for the
    cmp     ah,00h ! jz int21_e25       ; functions between 01h and 0Ch incl
    cmp     ah,0Ch ! ja int21_e25       ; when the ERROR_FLAG is 0
    cmp     error_flag,0 ! jz int21_e30 mov     int28_flag,FALSE            ; Do NOT Generate INT28s
    mov     bx,offset error_stack       ; Use "ERROR" Stack for above
    jmps    int21_e30                   ; function when ERROR_FLAG set int21_e25:                              ; All other functions use "NORMAL"
    mov     bx,offset normal_stack      ; stack and force ERROR_FLAG to 00
    mov     error_flag,0                ; if someone has not returned to
                                        ; the INT24 handler.
    mov     int28_flag,FALSE            ; Do NOT Generate INT28s
```

```
        cmp     indos_flag,1            ; Check for re-entrancy
        jz      int21_e30
        mov     bx,offset reentry_stack ; and if re-entrant use special stack int21_e30:
    pop     reg_DS[bx]              ; Copy the USER's registers into
    pop     reg_BX[bx]              ; local Emulator memory mov reg_ES[bx],ES
    mov reg_DI[bx],di ! mov reg_SI[bx],si
    mov reg_DX[bx],dx ! mov reg_CX[bx],cx
    mov reg_BP[bx],bp ! mov reg_AX[bx],ax mov     es,current_psp          ; Get the PSP
        mov     PSP_USERSP,sp           ; Save the SS:SP pointer to
        mov     PSP_USERSS,ss             ; the register image ready for any
                                          ; Critical errors that might occur mov     reg_SP[bx],sp           ; Force the dos_SS:dos_SP to
        add     reg_SP[bx],18             ; point to the Interrupt structure
        mov     reg_SS[bx],ss             ; on the users stack mov     bp,bx                   ; Initialise the stack frame pointer
        push ds ! pop ss                  ; and now swap to the correct internal
        lea     sp,reg_SP[bx]             ; stack determined on entry
        sti mov     dos_FMASK,carry_flag    ; Assume that the carry flag will
        cmp ah,038h ! jae int21_e40       ; modified by the function. All DOS
        mov     dos_FMASK,0000            ; funcs below 38h preserve the Users int21_e40:                                ; Carry flag. Used by LOTUS etc.
    mov     dos_FLAGS,0000              ; Initial dos_FLAGS test    break_flag,0FFh             ; Is the Break Flag ON
    jz      int21_func                  ; NO - So continue
    cmp     bp,offset normal_stack      ; Is this a valid function to
    jnz     int21_func                    ; check for Control-C on entry
    call    break_check                 ; Handle the Control-C
```

```
;
; All function requests from all entry techniques and under all
; conditions (ie. re-entrancy) eventually arrive at this point
;
; CS:    PCMODE CODE
; DS:    PCMODE DATA
; SS:BP  Register Structure
; SS:SP  LOCAL or USER Stack
; ES:BX  Unknown
; Other: As at entry
;

int21_func:
If IDLE_DETECT
    test  idle_flags,IDLE_ENABLE
    jnz   int21_active                ; IDLE checking Disabled
    cmp ah,5Ch ! jz int21_inactive    ;Treat Lock/Unlock as inactive some
                                      ; applications poll locked record.
    cmp ah,44h ! jz int21_inactive    ; IO Control Treated as Inactive
    cmp ah,2Dh ! jnc int21_active     ; Set Time Or Above All Active
    cmp ah,0Bh ! jz int21_inactive    ; Console Status
    cmp ah,0Ch ! jz int21_inactive    ; Flush and Invoke Treated as Inactive
    cmp ah,19h ! jz int21_inactive    ; Get Current Disk
    cmp ah,2Ah ! jz int21_inactive    ; Get Current Date
    cmp ah,2Ch ! jz int21_inactive    ; Get Current Time
    cmp ah,06h ! jnz int21_active     ; Treat RAW_IO Status as Inactive
    cmp dos_DL,0FFh ! jnz int21_active int21_inactive:
    call  inactive                    ; Process this INACTIVE function
    jmps  int21_f10                   ; and then continue execution int21_active:                         ; Active function Executed
    mov   bx,idle_max                 ; Reset the ACTIVE function Count
    mov   active_cnt,bx               ; using the DS relative FLAG
    or    idle_flags,IDLE_DOSFUNC     ; Set DOSFUNC flag for BIOS
int21_f10:
endif mov   bx,pcmode_ftl * 2           ; Illegal Function Handler
```

```
    cmp    ah,pcmode_ft1             ; Check for a valid function
    ja     int21_f20                 ; Illegal Function
    xchg   al,ah ! cbw               ; Generate the function offset
    mov    bx,ax ! shl bx,1          ;   in the internal table int21_f20:
    call   pcmode_ft[bx]             ; Execute the function
    mov    ax,dos_FLAGS              ; mov dos_FLAGS into AX
    mov    cx,dos_FMASK              ; mov dos_FMASK into CX
    cli                              ; Stop anybody interfering
    dec    indos_flag                ; Decrement the INDOS_FLAG
    mov    bx,bp                     ; Get the Stack frame address
    mov    ss,reg_SS[bx]             ; Restore the User Stack
    mov    sp,reg_SP[bx]             ; set the flags correctly mov    bp,sp                     ; Get the Stack Frame
    and    ax,cx                     ; Prevent unspecified flags being SET
    not    cx                        ; Complement CX to give -FMASK
    and    word ptr 04[bp],cx        ; AND FLAGS with dos_FMASK
    or     word ptr 04[bp],ax        ;     and OR with dos_FLAGS push   reg_BX[bx]
    mov ax,reg_AX[bx] ! mov bp,reg_BP[bx]
    mov cx,reg_CX[bx] ! mov dx,reg_DX[bx]
    mov si,reg_SI[bx] ! mov di,reg_DI[bx]
    mov es,reg_ES[bx] ! mov ds,reg_DS[bx]
    pop    bx
    iret
if IDLE_DETECT
;
; This function is invoked when an INACTIVE function Status
; check, Get Date or Time is called. INACTIVE then decrements the
; active function count and causes a dispatch when this reaches 0.
; Thus any program which is spining its wheels waiting for user input
; will be prevented from hogging the CPU.
;
    Public   inactive
inactive:
    push es ! push ax
```

```
    dec    active_cnt              ; Decrement the count
    jnz    inactive_10             ; Return if Non-Zero mov    ax,idle_max             ; Get the default count value
    mov    active_cnt,ax           ; and reset the internal count test   idle_flags,IDLE_ENABLE  ; Has Idle Checking been enabled
    jnz    inactive_10             ; Skip if NO.
    mov    ax,PROC_IDLE            ; Process is IDLE
    callf  idle_vec                ; Call the IDLE Handler inactive_10:
    pop ax ! pop es
    ret ;
; This routine will reset the active count for functions which
; are treated as INACTIVE but which have active sub-functions.
;
    Public  active
active:
    push   ax
    mov    ax,idle_max             ; Get the default count value
    mov    active_cnt,ax           ; and reset the internal count
    pop    ax
    ret
endif ; ++++++++++++++++++++++++++++
; INT28 - DOS Spooler Support
; ++++++++++++++++++++++++++++
;
; In MS-DOS this interrupt vector is called when the OS is waiting
; for an event and the ERROR_FLAG flag is 0, that is, when
; waiting for user input for sub-function 0Ah. This feature is
; used mainly by the MS-DOS print spooler and SideKick in order to
; execute DOS functions while the operating system is waiting for
; an event.

Public   int28_entry           ; Default Idle Handler
    Public   int33_entry           ; IRET for MicroSoft Mouse Handler
```

```
int28_entry:

int33_entry:

iret

Public   do_int28 do_int28:

cmp   indos_flag,1              ; Only execute an INT28
   jnz   di28_exit                 ; when the INDOS flag is 1
   cmp   int28_flag,TRUE           ; Only generate INT28s for the
   jnz   di28_exit                 ; selected functions if IDLE_DETECT
   cmp   int28_delay,0             ; Has the INT28 Loop count reached
   jnz   di28_10                   ; Zero if NO skip delay and execute
   push  int28_reload              ; INT28. Otherwise DELAY/DISPATCH
   pop   int28_delay
   test  idle_flags,IDLE_ENABLE    ; Has Idle Checking been enabled
   jnz   di28_10                   ; Skip if NO
   push  ax
   mov   ax,PROC_INT28             ; Process is IDLE
   callf idle_vec                  ; Call the IDLE Handler
   pop   ax di28_10:
   dec   int28_delay
endif
   push  es                        ; save ES
   mov   es,current_psp            ; Get the PSP
   push  PSP_USERSP                ; Save the SS:SP pointer to
   push  PSP_USERSS                ; the register image if IDLE_DETECT                     ; Set IDLE_INT28 so $IDLE$ knows
   or    idle_flags,IDLE_INT28     ; that we are nolonger inside DOS
endif
   int   28h                       ; Execute an INT28 for SideKick and
                                   ; the PRINT utility. INDOS flag is 1 if IDLE_DETECT                     ; Reset IDLE_INT28 so $IDLE$ knows
   and   idle_flags,not IDLE_INT28 ; that we are back DOS
endif
```

```
    mov     int28_flag,TRUE        ; Restore INT28_FLAG
    mov     es,current_psp         ; Get the PSP.
    pop     PSP_USERSS             ; Restore the SS:SP pointer to
    pop     PSP_USERSP             ;   the register image
    pop     es                     ;   (TSR's will have corrupted it..)
di28_exit:
    ret
```

;; ----------------------------------------------------------------
;; from ioctl.pcm
;************************
; *     CCP/M Extension     *
; *     Sub Function 56     *
; * History Buffer Cntrl    *
;*******************************
; This function changes the default history buffer used for func0A:
; DL = 1 -> Command.com history Buffer
; DL = 0 -> Standard Process Buffer

```
f4456:
    mov     al,@hist_flg           ; Get the current History Status
    mov     dos_AL,al
    and     @hist_flg,not 1        ; Reset Command Processor Flag
    mov     al,dos_DL ! and al,01  ; Get new state and mask bit
    or      @hist_flg,al           ;    then OR new state into flags
if IDLE_DETECT
    and     idle_flags,not IDLE_COMMAND
    or      byte ptr idle_flags,al
endif
    ret
```

;*******************************
; *     CCP/M Extension     *
; *     Sub Function 58     *
; *   Private Data Func     *
;*******************************
; On Exit ES:BX points to our DRDOS private data.
;         ES:AX points to the IDLE Data Area

```
f4458:
    mov     dos_ES,ds              ; return ES:BX pointing to private data
```

```
mov     dos_BX,offset @private_data
mov     dos_AX,offset idle_data
ret
```

LISTING 2

```
;;************************************************************;
;--------------------------------------------------------------;
; NAME: IDLE86.ASM
;--------------------------------------------------------------;
; Copyright (C) 1990 Digital Research Inc.  All rights reserved.
;--------------------------------------------------------------;
;
        include I:DRMACROS.EQU      ; standard DR macros
        include I:REQHDR.EQU        ; request header equates
        include I:DRIVER.EQU        ; device driver equates
        include IDLE.EQU            ; include custom equates TEST            equ     TRUE
CR              equ     0dh
LF              equ     0ah
EOM             equ     '$'
INT_8           equ     8h
INT_11          equ     11h
INT_16          equ     16h
LOWER_CASE      equ     20h         ; convert upper case to lowercase
TAB             equ     8           ; ASCII tab
DOS_INT         equ     21h
MS_C_WRITESTR   equ     09h         ; DOS function for string output
MS_S_SYSDAT     equ     52h
MS_S_GETINT     equ     35h
MS_S_SETINT     equ     25h ;--------------------------------------------------------------;
; This part of the driver resides in RAM even in a ROMed version of $IDLE$.
;--------------------------------------------------------------;

CGROUP  group   CODE, RCODE, ICODE
CG      equ     offset CGROUP
        Assume  CS:CGROUP, DS:CGROUP, ES:CGROUP, SS:Nothing
```

```
CODE    segment public word 'CODE'

; Set-up the link to the next driver using conditional assembly.
; ----------------------------------------------------------------
;
IFDEF DDRIVER
  nxt_drvr      equ     -1
  nxt_seg       equ     -1              ; No more drivers.
ELSE
  IFDEF EMBEDDED
    extrn       ramdsk_drvr:word        ; Next device in the chain
    nxt_drvr    equ     ramdsk_drvr     ; Link to nxt driver
    nxt_seg     equ     0               ; INIT.ASM pokes run-time CS here.
  ELSE
    nxt_drvr    equ     -1
    nxt_seg     equ     -1              ; No more drivers.
8 ENDIF
  extrn endbios:word                    ; for device driver INIT function
ENDIF ; Device driver header.
; ----------------------
                public  idle_drvr
idle_drvr       dw      nxt_drvr,nxt_seg; link to next driver
myattrib        dw      0C800h          ; attribute
                dw      CG:strat
                dw      CG:intrp
idle_id         db      '$IDLE$  '      ; must be 8 characters
IDLE_ID_SZ      = $-idle_id ; Local data storage.
; --------------------
                even
IFNDEF DDRIVER
extrn req_off:word
extrn req_seg:word
extrn req_ptr:dword
ELSE
```

```
req_ptr         label   dword
req_off         dw      ?
req_seg         dw      ?
ENDIF param_blk       label   dword
param_blk_off   dw      0
param_blk_seg   dw      0
int08_seg       dw      0
int16_seg       dw      0
int1C_seg       dw      0
int28_seg       dw      0
old_int8        label   dword       ; original interrupt handler address
old_int8_off    dw      0
old_int8_seg    dw      0
old_int16       label   dword       ; original interrupt handler address
old_int16_off   dw      0
old_int16_seg   dw      0
int16_func      dw      0
minutes         db      ?
hours           db      ?
hundredths      db      0
seconds         db      ?
```

;----------------------------------------------------------------------
; Communication with this device driver is as follows. Firstly INIT is
; called by the CONFIG processor in BIOS.SYS. Having initialised, the
; BDOS then makes a DEVICE OPEN call. We just return good status to say that
; we are here. Next the BDOS makes an IOCTL OUTPUT call, and writes 4 bytes
; of data to us. These four bytes are a DWORD address of the IDLE STATE DATA
; AREA. We must save this address, then reset bit 7 of offset IDLE_FLAGS, in
; the Idle State Data Area followed by writing the DWORD address of our
; IDLE_DETECT routine to offset IDLE_VEC in the Idle State Data Area. Finally
; the BDOS makes a device close call, whereby we return a good status.
;
; The Device Driver interface is not used after that. All subsequent
; communication with $IDLE$ is via the BDOS calling the IDLE_DETECT
; routine directly, via a far call to the address stored at offset IDLE_VEC
; in the Idle State Data Area. A function code is in AX
;

Assume DS:nothing, SS:nothing, ES:nothing

; Strategy routine in RAM in all versions.
; ---------------------------------------------

```
strat    proc    far
         mov     req_off,bx           ; save pointer to request packet
         mov     req_seg,es
         ret
strat    endp
```

; Interrupt routine with RAM jump table to RAM or ROM.
; ----------------------------------------------------

; This next bit sets up the DS and calls the ROMable code for the $IDLE$
; interrupt procedure.
;

```
intrp_vector   label   dword
intrp_ptr      dw      CG:init ; This is patched to CG:intrp by dd_init.
rom_cs_fixup   dw      0       ; intrp pokes run-time CS here.
               dw      0EDCh   ; ROM segment fixup signature
intrp   proc    far             ; This code lets us decide during INIT which segment
  push  ds                      ; the far call to the interrupt routine uses
        push    cs
        pop     ds              ; point DS to our data segment, here
        cmp     rom_cs_fixup,0
        jne     fixed_up        ; If not fixed up yet we are running from RAM
  mov   rom_cs_fixup,cs
fixed_up:
        call    intrp_vector    ; call ROMable code through vector
        pop     ds
        ret
intrp   endp
```

; INT16h handler with RAM jump table to RAM or ROM.
; -------------------------------------------------

; This next bit sets up ES and calls the ROMable code for the $IDLE$
; int16 handler.

```
int16_vector   label   dword
```

```
                dw      CG:int16_code
int16_cs_fixup  dw      ?           ; dd_init pokes run-time CS here
int16_handler   proc    far
        push    es
        push    cs
        pop     es                  ; Point ES to our data segment, here
        pushf
        call    int16_vector        ; JuMP to ROMable code through vector
        pop     es
        sti
        ret     2                   ; discard previous flags
int16_handler   endp
; INT8h handler with RAM jump table to RAM or ROM.
; ;-----------------------------------------------------
; This next bit sets up ES and calls the ROMable code for the $IDLE$
; int8handler.
;
int8_vector     label   dword
                dw      CG:int8_code
Int8_cs_fixup   dw      ?           ; dd_init pokes run-time CS here
int8_handler    proc    far
        push    es
        push    cs
        pop     es                  ; Point ES to our data segment, here
        pushf
        call    int8_vector         ; JuMP to ROMable code through vector
        pop     es
        iret
int8_handler    endp
; Idle handler with RAM jump table to RAM or ROM.

; -----------------------------------------------
; This next bit sets up ES and calls the ROMable code for the $IDLE$
; idle detection routines.
;
idle_vector     label   dword
                dw      CG:idle_detect
idle_cs_fixup   dw      ?           ; dd_init pokes run-time CS here.
```

```
idle_handler   proc   far push    es
       push    cs
       pop     es              ; Point ES to our data segment, here
       call    idle_vector     ; JuMP to ROMable code through vector
       pop     es
       ret
idle_handler   endp
CODE    ends RCODE   segment public 'RCODE'
; ----------------------------------------------------
; The code and data from here on can be run from ROM.
; ----------------------------------------------------

Assume  CS:CGROUP, DS:CGROUP, ES:CGROUP, SS:Nothing tick_table     dw      002DDh, 64h
               dw      0AAB6h, 01h
               dw      0071Ch, 00h count_table    dw      CG:hours
               dw      CG:minutes
               dw      CG:seconds idle_intrpt    proc    far pushf                           ; save flags for exit
       pushx   <ax, bx, cx, dx, si, di, ds, es> les     bx, [req_ptr]           ; get request header

; is this a device open ?
       cmp     RH_CMD, CMD_DEVICE_OPEN
       je      dd_open                 ; Yes, then jump ; is this a device close ?
       cmp     RH_CMD, CMD_DEVICE_CLOSE
       je      dd_close                ; Yes, then jump
```

```
; is this a device write ?
        cmp     RH_CMD, CMD_OUTPUT_IOCTL
        je      dd_ioctl_output         ; Yes, then jump
                                        ; No, then set error and return
        or      RH_STATUS, INVALID_CMD  ; return error status
        jmps    int_err
int_ret:
        les     bx, req_ptr             ; get request header again
        or      RH_STATUS, RHS_DONE     ; return "done it"
int_err:
        popx    <es, ds, di, si, dx, cx, bx, ax>
        popf
strat_entry:                            ; if strategy entry then just return
   retf idle_intrpt   endp Assume  DS: CGROUP              ; normalize Assumes dd_open:
;------
; This routine handles a DEVICE OPEN function. We just return with good
; status
        jmp     int_ret dd_close:
;-------
; This routine handles a DEVICE OPEN function. We just return with good
; status
        jmp     int_ret dd_ioctl_output:
;---------------
; This routine receves the SEG:OFF address of the BDOS idle parameter block
; There is some intricate usage of segment registers here. This is
```

; required if running in ROM and therefore the need exists to preserve
; segment pointers to the local data, the BDOS data area and the device
; driver request header data segment. Since these three segments must be
; referenced by only two registers DS and ES, care must be taken.
;
; Now install our own INT handlers to complete the $IDLE$ initialisation.
;
; Get the current handler address for idle interrupt INT_16.

```
        push    es xor     ax,ax
        mov     es,ax                   ; es -> int vectors mov     ax,es:word ptr (16h*4)  ; Get the current INT16h off
        mov     [old_int16_off], ax
        mov     ax,es:word ptr (16h*4+2); Get the current INT16h seg
        mov     [old_int16_seg], ax
```

; Set the new handler.

```
        mov     ax, offset int16_handler
        mov     es:word ptr (16h*4),ax   ; Set the new INT16h seg
        mov     ax,ds
        mov     es:word ptr (16h*4+2),ax; Set the new INT16h seg
        mov     [int16_seg],ax          ; save int16h handler seg
```

; Install our own INT8h handler.
;
; Get the current handler address for idle interrupt INT_8.
;

```
        mov     ax,es:word ptr (8*4)    ; Get the current INT8 off
        mov     [old_int8_off], ax
        mov     ax,es:word ptr (8*4+2); Get the current INT8 seg
        mov     [old_int8_seg], ax      ; Set the new handler.
        mov     ax, offset int8_handler
        mov     es:word ptr (8*4),ax    ; Set the new INT8 offset
        mov     ax,ds
        mov     es:word ptr (8*4+2),ax; Set the new INT8 seg
        mov     [int08_seg],ax          ; Save int8 handler seg
```

```
; Get the current handler address for user tick INT1ch and idle INT 28h
; and save the segment value so that we can detect if they have been taken
; over later on.
;
; Get the current handler address for user tick int.
;
        mov     ax,es:word ptr (1ch*4+2); Get the current INT1ch segment
        mov     [int1C_seg], ax ; Now get the segment address of the INT28h vector and save it for CHK_TSR
; to use.
        mov     ax,es:word ptr (28h*4+2); Get the current INT28h segment
        mov     [int28_seg], ax
        pop     es push    es                      ; save ES (-> request header?)
        push    di ; Check to see that we are to receve 4 bytes.

mov     ax,RH4_COUNT            ; check the count.
        cmp     ax,DD_OUT_COUNT         ; is it the size we require ?
        jz      dd_output_10            ; Yes, skip
        xor     ax,ax                   ; set count to zero
        mov     RH4_COUNT,0             ; set the count
        or      RH_STATUS,OUTPUT_ERR    ; return error status
        jmp     dd_output_err           ; quit
; length looks good, read the data.
;
dd_output_10:
        cld                             ; set direction to increment
        push    si
        push    di push    ds                      ; save our local DS push    es                      ; save someones ES
        les     si,RH4_BUFFER           ; get address of data buffer
```

; ES:SI=BDOS data packet.

; DS=local data

; Store the address of the parameter block in our data area.
;

```
        mov     di,es:[si]
        mov     param_blk_off,di
        add     si,2 mov     ax,es:[si]
        mov     param_blk_seg,ax
        push    ds                      ; get local DS into ES
        pop     es                      ; es->local data segment
        mov     ds,ax                   ; ds:di -> idle param blk
```

; ES=$IDLE$ local data
; DS=BDOS Idle State Data Area segment
; Set the address of our idle detection routine at offset IDLE_FLAGS in the
; Idle State Data Area.

```
        mov     IDLE_DRIVER_OFF,offset idle_handler
        mov     ax,es
        mov     IDLE_DRIVER_SEG,ax
```

; Now reset the $IDLE$ driver enabled bit in the idle parameter block, to
; tell the BDOS that we are ready and willing.

```
        and     IDLE_FLAGS,NOT IDLE_INIT
```

; Here is where any values can be poked into the IDLE STATE DATA AREA
; to customise the driver to suit a particular architecture.

```
        mov     IDLE_MAX, IDLE_MAX_DEF          ; poke idle_max
        mov     INT28_RELOAD, INT28_RELOAD_DEF  ; poke int28_reload
```

; Now calculate the initial value in IDLE_CNTDN. The idea being to find out
; how long it takes to do an INT16 status check. This OPERATION will give a
; factor to apply which will take acount of the performance of the computer.

```
        call    calc_idlecntdn
```

```
        pop     es                      ; ES->?
        pop     ds                      ; DS->local data pop     di
        pop     si pop     di
        pop     es                      ; es:di->req hdr
        jmp     int_ret
dd_output_err:
        pop     di
        pop     es                      ; es:di->req hdr
        jmp     int_err
;================================================================
;=============== Dynamic IDLE Detection routines ================
;================================================================
; entry
;       DS = IDLE STATE DATA AREA data segment
;       ES = $IDLE$ local data segment
;       AX = function number
;       1 PROC_IDLE.  BDOS detects an idle condition.
;       2 PROC_INT28. BDOS detects application in int28h idle loop.
;       3 PROC_KEYIN. BDOS detects idle due to wait on keybard event.
;       4 PROC_DEVIN. BDOS detects an idle due to wait on device event.
; exit
;       none
idle_detect:
        push    di                      ; Save DI register and initialise
        mov     di,es:param_blk_off     ; Parameter block pointer
        cmp     ax,PROC_IDLE            ;   CASE PROC_IDLE
        je      idle_20                 ;     PERFORM PROC_IDLE
                                        ;   ENDCASE
        cmp     ax,PROC_INT28           ;   CASE PROC_INT28
        je      idle_30                 ;     PERFORM PROC_INT28
                                        ;   ENDCASE
        cmp     ax,PROC_KEYIN           ;   CASE PROC_KEYIN
        je      idle_40                 ;     PERFORM PROC_KEYIN
                                        ;   ENDCASE
```

```
        cmp     ax,PROC_DEVIN           ;       CASE PROC_DEVIN
        je      idle_50                 ;           PERFORM PROC_DEVIN
                                        ;       ENDCASE
        mov     ax,INVALID_FUNCTION     ;          invalid function
                                        ;       ENDOTHERWISE
                                        ;   ENDSWITCH
end_idle:
        pop     di
        retf
idle_20:
;------
; This routine sends the CPU to sleep by calling wait_idle. It is
; woken up again on an event such as H/W event/timer tick.
;
        call    wait_idle               ; Execute Idle Wait
        jmp     end_idle idle_30:
;------
; This routine sends the CPU to sleep by calling wait_idle. It is
; woken up again on an event such as H/W event/timer tick.
;
        call    wait_idle28             ; Execute Idle Wait
        jmp     end_idle idle_40:
;------
; This routine handles the PROC_KEYIN function. It should send the CPU
; to sleep until a keyboard event occurs.
;
        call    wait_keyin              ; Keyboard Wait Checks
        jmp     end_idle                ; Return to DR DOS idle_50:
;------
; This routine handles the PROC_DEVIN function.
```

```
        xor     ax,ax                   ; return good status
        jmp     end_idle
```

;--------------------------------------------------------------------------;

Module INT_16

; ============

;

; entry

;       ES=$IDLE$ local data segment

; exit

;       none.

; function

;       This routine is activated during a ROS keyboard service. If we are
;       inside DOS, i.e called by the kernel, then we perform no idle checks and go
;       directly to the old handler and perform the read/status call etc. If we are
;       not in DOS, then we check to see if it a read or a status call. If it is a
;       read, then we convert it to a status call and see if a char is there. If it
;       is, we jmp to the old driver to read it. If there is not a char there, then
;       we go to sleep by calling WAIT_KEYIN. If it is a status check, then we
;       decrement idle count and see if it goes to zero. If it does, then we can
;       assume that this status call being made, is because the application is
;       twidling its thumbs idling. We therefore reset the idle count and perform
;       a WAIT_IDLE call to go to sleep.

;

```
int16_code:
        push    di
        push    ds
        push    ax lds     di,es:param_blk         ; Get the IDLE State Data Area
        call    chk_indos               ; are we inside the kernel ?
        jnz     int16_h10               ; Yes, jmp to old int 16 handler
                                        ; for Kernel calls cmp     ah, 0                   ; keyboard read?
        je      int16_h20               ; yes, skip
        cmp     ah, 10h                 ; No, extended keyboard read?
        je      int16_h20               ; yes skip, No ...
; check for IDLE ON
        test    IDLE_FLAGS,IDLE_ON      ; is idle detection turned on ?
        jnz     int16_h10               ; No, then skip
```

```
        dec     IDLE_COUNT              ; Yes, then decrement IDLE count jnz     int16_h10               ; Skip if Non-Zero mov     ax, IDLE_MAX            ; Reset Counter mov     IDLE_COUNT, ax          ;

call    wait_idle               ; Execute IDLE Delay int16_h10:

pop     ax                      ; and other User registers pop     ds                      ; Restore Function pop     di                      ;

jmp     es:[old_int16]          ; pass straight through to BIOS int16_h20:

pop     ax int16_h30:

push    ax                      ; Save Original Function inc     ah                      ; read -> stat; ext read -> ext pushf                           ; status call    es:[old_int16]          ; ZF=0 - key code ready jnz     int16_h10               ; code available call    wait_keyin pop     ax jmp     short int16_h30
```

;---------------------------------------------------------------------;

Module INT_8

; ============

;

; entry

;       ES=$IDLE$ local data segment.

; exit

;       none.

; function

;       This routine is activated every int8 timer tick. Its function is to
; reset IDLE_COUNT and INT28_DELAY to the maximum count down values.
; This will ensure that only applications that go idle quickly, within
; a single clock tick, go idle. Thus applications that are busy but polling
; the keyboard, will not go idle if it takes a long time to count down from
; IDLE_MAX or INT28_RELOAD to zero.

```
int8_code:
        push    ds
        push    di
        push    ax lds     di,es:param_blk         ; Get the IDLE State Data Area
        mov     ax,IDLE_MAX             ; Reset Counter
        mov     IDLE_COUNT,ax           ;
        mov     ax,INT28_RELOAD         ; Reset Counter
        mov     INT28_DELAY,ax          ;

pop     ax
        pop     di
        pop     ds
        jmp     es:[old_int8]
```

;----------------------------------------------------------------;

Module WAIT_KEYIN

; ================

;

; entry
;       none.
; exit
;       none.
; function
;       This routine attempts to make the CPU sleep until a keyboard event
; occurs. However there are some conditions when this should not happen,
; namely video activity and other TSRs. If the screen has been updated since
; we last checked then we should not go to sleep. If an application or TSR
; has control of the timer interrupts then we should idle but wake up on the
; next clock tick. This will give the TSR a chance to do its stuff, since if
; we blindly sleep until a key is pressed, it may effect other TSRs who relly
; on coming awake on an INT8h or INT1Ch. If none of this applies then it is
; assumed safe to sleep until the next keyboard event, since nothing is going
; to happen until a key is pressed.
;
;

```
wait_keyin:
        call    chk_int16               ; Check if int 16h changed
        call    chk_activity            ; Video or serial ports been used ?
```

```
        jnz     wait_k20                ; Yes Skip the Delay function
                call    chk_tsr         ; Check if any interrupt vectors have
        mov     al,KBD_INT_MASK         ; been taken over if not then wait
                jz      wait_k10        ; until the next keyboard interrupt
                mov     al,ALL_INTS
wait_k10:
        jmp     go_to_sleep wait_k20:
        ret
```

;----------------------------------------------------------------;

Module WAIT_IDLE

; ===============

;

; entry

;       none.

; exit

;       none.

; function

;       This routine attempts to make the CPU sleep until a H/W event such as
; a timer tick or keyboard occurs. However there are some conditions when
; this should not happen, namely video activity. If the screen has been
; since we last checked then it may be that the application is performing
; some processing like re-painting the screen, but looks as if it is idle
; because it is making int16h calls etc. In this instance we should not
; go_to_sleep. If none of this applies then it is assumed safe to sleep
; until the next H/W event.

;

```
wait_idle:
        call    chk_activity            ; Video/serial ports been used ?
        jnz     wait_i10                ; Yes Skip the Delay function
        mov     al,ALL_INTS             ; Wait for the next hardware int
```

; before we go to sleep, we must check the time taken to detect an idle. If
; this is a long time, we must assume that the application is not really idle
; but is polling the keyboard periodically.

```
        call    chk_time                ; Want to sleep 'ay
```

```
         jc      wait_i10              ; too slow, skip the delay function.
  jmp    go_to_sleep wait_i10:
       ret

;----------------------------------------------------------------;

Module WAIT_IDLE28

; ==================
;
; entry
;       none.
; exit
;       none.
; function
;       This routine attempts to make the CPU sleep until a H/W event such as
; timer tick or keyboard occurs. However there are some conditions when this
; should not happen, namely video activity. If the screen has been updated
; since we last checked then it may be that the application is performing
; some processing like re-painting the screen, but looks as if it is idle
; because it is making int28h calls. In this instance we should not
; go_to_sleep. If none of this applies then it is assumed safe to sleep
; until the next H/W event.
;
wait_idle28:
       call    chk_activity          ; Video/serial ports been used ?
       jnz     wait28_i10            ; Yes, Skip the Delay function
       mov     al,ALL_INTS           ; Wait for the next hardware int
       jmp     go_to_sleep wait28_i10:
       ret

;----------------------------------------------------------------;

Module CHK_TIME

; ===============
; entry
;       DS=idle state data segment
;       ES=$IDLE$ local data segment
; exit
```

```
;        carry Flag = Set if the application is not idle .
;                   = Reset if application is idle.
; function
;       This routine checks to see how long it has taken to detect that we
; are idle. If it is a short time, then we can assume that the application
; is probably idle, because it is sitting there in a tight loop polling
; the keyboard. If it has taken a long time to detect an idle, we assume that
; the applicaiton has been busy in between polling the keyboard, so flag
; that we consider the application to be busy.
chk_time:
        push    ax
        push    cx
        push    dx
        push    di
        push    ds
        push    es
        call    read_timer              ; how long did it take us to get here
; check the time taken to idle.
        lds     di,es:param_blk         ; Get the IDLE State Data Area
        cmp     IDLE_CNTDN,ax           ; Skip, if too long
        pop     es
        pop     ds
        pop     di
        pop     dx
        pop     cx
        pop     ax
        ret                             ; CF=0 if idle; 1 if busy
;----------------------------------------------------------------- ;
Module CHK_ACTIVITY
; ==================
; entry
;       ES= $IDLE$ data segment
; exit
;       Zero Flag = Set if no video or serial activity .
;                 = Reset if there has been activity.
; function
;       This routine checks to see if there has been any video or serial
; port activity and if the floppy motor drive time-out has reached zero yet.
```

; This particular implimentation checks video and serial port status by
; reading from ACTIVITY_PORT which returns bit 6 set if the screen RAM has
; been updated since we last read the port, and bits 0 and 1 set for activity
; on COM1 and COM2 respectively. A value of zero read from the port indicates
; no activity since we last read the port. The floppy motor time-out status
; is checked by reading the byte at 40:3f. If it is 0 then the motor will
; have timed out and stopped. If it is non-zero, then we must return this
; status to the caller so that we do not go to sleep until the motor has
; stopped.
;

```
chk_activity:
        push    dx
        in      al,ACTIVITY_PORT        ; read the status
        pop     dx
chk_v10:
        or      al,al                   ; any activity yet ?
        jnz     end_chk_activity        ; Yes, then leave now
```

; Before we go, we must ensure that the floppy disk is not still rotating
; on the time-out count at 40:3f in the BIOS data area. If this byte is
; zero then we can flag all is okay (ZF=1). If not, return ZF=0

```
chk_floppy:
        push    es
        push    bx
        mov     bx,40h
        mov     es,bx
        mov     bx,3fh
        cmp     byte ptr es:[bx],0      ; are we still counting ?
        pop     bx                      ; ZF=Set if not counting;
        pop     es
        jz      no_activity             ; If nothing happened, Skip
end_chk_activity:
```

; Since there has been activity, we must reset the idle count to IDLE_MAX
; otherwise we may go to sleep during some activity.

```
        pushf
```

```
        push    ds
        push    di
        lds     di,es:param_blk         ; Get the IDLE State Data Area
        mov     ax,IDLE_MAX             ; Reset Counter
        mov     IDLE_COUNT,ax           ;
        mov     ax,INT28_RELOAD         ; Reset Counter
        mov     INT28_DELAY,ax          ;
        pop     di
        pop     ds
        popf
no_activity:
        ret                             ; return with status in ZF.
;------------------------------------------------------------------;
Module CHK_TSR
; ==============
;; entry
;       ES=$IDLE$ local data segment
; exit
;       Zero Flag = Set if no TSRs active.
;                 = Reset if TSRs detected.
; function
;       This routine checks to see if any TSRs have taken over the timer or
; idle interrupts 8h, 1Ch or 28h. If a TSR has control of these interrupts,
; then it is likely that they will want to come alive and perform some
; processing on such an event. It is therefore essential that we detect them
; and wake up from an idle on such an event, even though the application in
; foreground may appear to be completely idle and not require waking up
; itself.
;
chk_tsr:
        push    ds
        xor     ax,ax
        mov     ds,ax
        mov     ax,ds:word ptr (08*4+2) ; Get the current INT08
        cmp     ax,es:int08_seg         ; ISR Segment address if this has
        jnz     chk_tsr10               ; changed since INIT then return NZ
        mov     ax,ds:word ptr (1Ch*4+2) ; Get the current INT1C
        cmp     ax,es:int1C_seg         ; ISR Segment address if this has
        jnz     chk_tsr10               ; changed since INIT then return NZ
```

```
            mov     ax,ds:word ptr (28h*4+2) ; Get the current INT28
            cmp     ax,es:int28_seg         ; ISR Segment address if this has
            jnz     chk_tsr10               ; changed since INIT then return NZ
            xor     ax,ax
chk_tsr10:
            pop     ds
            ret ;----------------------------------------------------------------;
Module CHK_INDOS
; ================
; entry
;       DS=idle state data area segment.
; exit
;    Zero Flag = zero if we are not inside DOS
;              = non-zero if inside DOS, i.e. called by Kernel function.
;       This routine checks to see if the caller is the DOS kernel. It
; tests the value of IDLE_INDOS. If it is zero, then the caller was not
; inside DOS when the call was made. If it is > 1 then it must be inside
; DOS, and since it is >1 and not =1, it must be the Kernel. If IDLE_INDOS
; is 1, then we further check to see if we are in DOS because of
; call from within DOS.
;

chk_indos:
            push    ax
            xor     ax,ax
            push    di                      ; Save the Structure address
            mov     di,IDLE_INDOS           ; Get the INDOS Flag
            cmp     byte ptr [di],1         ; Is the kernel making this call ?
pop   di                                    ; Restore address
            jb      chk_i20                 ; INDOS is zero therefore outside DOS
            ja      chk_i10                 ; INDOS > 1 Therefore INSIDE DOS
            test    IDLE_FLAGS,IDLE_INT28   ; Check if INT28 function call being
jnz   chk_i20                               ; TSR taken over INT28
chk_i10:
            mov     al,1
chk_i20:
            or      ax,ax
            pop     ax
            ret
```

; ----------------------------------------------------------------- ;

Module CHK_INT16

; ================

; entry

;       DS=idle state data area segment

;       ES=$IDLE$ local data segment

; exit

;       none.

; function

;     This routine checks to see if the INT16h handler has been superseeded.
; If it has, the time taken to detect an idle state may increase beyond the
; value in IDLE_CNTDN, which would result in never going idle. Hence the
; segment is the value of the INT16 handler. If it changes, the new value is
; saved and the value for IDLE_CNTDN is re-calculated so that the time taken
; to idle is realistic, given that it may now take longer to detect an idle.

```
chk_int16:
        push    es
        push    ds
        push    di
        xor     ax,ax
        mov     ds,ax
        mov     ax,ds:word ptr (16h*4+2); Get the current INT16h
        cmp     ax,es:int16_seg         ; ISR Segment address if this has not
jz      chk_int16_end                   ; changed since INIT then return
```
; So, int16h has been taken over, we must now save this segment address, and
; then re-calculate the value for IDLE_CNTDN.

```
        mov     es:int16_seg,ax         ; save new value
        lds     di,es:param_blk
        call    calc_idlecntdn          ; re-calc IDLE_CNTDN
chk_int16_end:
        pop     di
        pop     ds
        pop     es
        ret
```

; ----------------------------------------------------------------- ;

Module GO_TO_SLEEP

; ==================

;

```
; entry
;       AL=bit map of events to wake-up on.
; exit
;       none.
; function
;       This routine is activated when we want to put the CPU to sleep.
; This could mean switching it off completely, or slowing down the
; clock rate in the example described. A byte is written to the
; IDLE_PORT to perform a frequency slow down of the CPU until a
; specified event occurs. The value written in the port contains bits
; to indicate that when a certain event occurs, the CPU should wake up again,
; hence if all bits are set, then we will come alive on every event.
; If the timer bit is not set then we will not come alive on a timer tick.
; The instruction is ideal for this since it only passes onto the
; next instruction following an interupt. If one is suppressed by writing
; to the IDLE_PORT, then the idle system stays asleep.
;
go_to_sleep:
        push    ax
        push    dx
        pushf                           ; Save INTerrupt State
        sti                             ; Enable INTerrupts
if TEST
        cmp     es:idle386,TRUE         ; Is the 386 driver loaded
        jz      go_to_s10               ; Yes use IDLE_PORT mov     dx,0021h                ; 8259 Control Port
        mov     ah,al                   ; Copy INTerrupt Vector mask ah
        in      al,dx                   ; Get the current value and save
        push    ax                      ; on the stack
        or      al,ah                   ; Set requested interrupt mask
        out     dx,al
        hlt                             ; Wait for the INTerrupt
        pop     ax                      ; Restore the original INTerrupt mask
    out dx,al                           ; and output to 8259
        jmp     go_to_s20
endif go_to_s10:
```

```
              not      al                      ; Complement AL
              mov      dx, IDLE_PORT
              out      dx, al                  ; set alarm on specified H/W event.
       test   al, NOT TIMER_INT_MASK           ; do we sleep through int8's ?
              pushf
go_to_s15:
              hlt                              ; go to sleep until next interrupt
popf
              jnz      go_to_s17               ; did we sleep thru' int8s
              call     set_tick                ; Yes!, so update the ROS tick count
go_to_s17:
              mov      al, NOT ALL_INTS        ; wake up on all ints now in case
              out      dx, al                  ; application does HLT itself.
go_to_s20:

; since an idle condition exists, the idle count is reset so that
; idle is not again entered straight away.
;
go_to_sleep_end:
              popf                             ; Restore Interrupt State
              pop      dx                      ; and registers
              pop      ax
              ret
;----------------------------------------------------------------;
Module SET_TICK
; ==============
;
; entry
;       ES=$IDLE$ local data segment.
; exit
;       ROS data area time updated.
; function
;       This module updates the timer tick count in the ROS data area.
; Since we have been asleep missing int8s, we must read the real-time clock
; and convert it to int8 timer ticks, and store it in the ROS data area.

set_tick:
```

; Since the processing has been asleep missing INT8s, the real-time clock
; must be read and the ROS data area timer tick count must be set.

```
        push    ax
        push    bx
        push    cx
        push    dx
        push    si
        push    di
        push    ds push    cs                      ; ds points to resident data seg
        pop     ds mov     ah,READ_RTC             ; set function code to read RTC
        int     RTC_INT                 ; get time using ROS.
; CH=hours in BCD, CL=minutes in BCD, DH=seconds in BCD. Convert from BCD to
; binary, then update the ROS data area.

cli                             ; stop the time updating mov     al,ch                   ; BCD hours in al
        call    bcd2bin                 ; convert to binary
        mov     es:hours,al mov     al,cl                   ; BCD minutes in al
        call    bcd2bin                 ; convert to binary
        mov     es:minutes,al mov     al,dh                   ; BCD seconds in al
        call    bcd2bin                 ; convert to binary
        mov     es:seconds,al ; set hundredths to zero in DX:CX.

sub     dx,dx
        sub     cx,cx                   ; CX:DX=32 bit tick count for 1/100s mov     si,CG:tick_table        ; counts of ticks/unit
```

```
            mov     di,CG:count_table       ; addresses of unit counts
output6:
            mov     bx,cs:[di]              ; get unit count address
            mov     al,cs:[bx]              ; all of that unit done?
output7:
            test    al,al                   ; any more hours/minutes/seconds?
            jz      output8                 ; yes,
            add     dx,cs:0[si]             ; add ticks per hour/minute/second
       adc  cx,cs:2[si]
            dec     ax
            jmps    output7                 ; try again
output8:
            add     si,4                    ; next unit tick count
            incx    <di, di>                ; next unit count address
            cmp     di,CG:count_table+6     ; end of table reached
            jne     output6                 ; repeat until all units done push    dx                      ; save lo count
            mov     ax, cx                  ; do hi count first
            xor     dx, dx                  ; clear top
            mov     bx, 100
            div     bx                      ; top word div 100
            mov     cx, ax                  ; keep it safe
            pop     ax                      ; recover lo word
            div     bx                      ; divide it (plus rem of hi)
            mov     dx, ax                  ; and put result in right place mov     ah,1                    ; set system timer
            int     RTC_INT                 ; CX = high word, DX = low word sti
            pop     ds
            pop     di
            pop     si
            pop     dx
            pop     cx
            pop     bx
            pop     ax
```

```
            sti
            ret
```

; ---------------------------------------------------------------- ;

Module READ_TIMER

; ================

;

; entry

;       none.

; exit

;       AX=timer tick count.

; function

;       To read the tick count from the timer chip.

;

```
read_timer:
            mov     al,0
            out     TIMER_CMND_REG,al       ; latch timer 0
            in      al,TIMER_0_REG          ; lsb
            mov     ah,al
            in      al,TIMER_0_REG          ; msb
            xchg    al,ah                   ; swap to word value
            not     ax                      ; convert to ascending count
            ret
```

; ---------------------------------------------------------------- ;

Module CALC_IDLECNTDN

; ====================

;

; entry

;       ds:di = ptr to idle state data area.

; exit

;       IDLE_CNTDN variable updated.

; function

;       To calculate the time taken to perform IDLE_MAX RTC reads and
; int16 status checks. This value is then used to determine if an IDLE_PROC
; call should go ahead based on the time taken to come to the decision to
; go idle.

;

calc_idlecntdn:

```
        push    bx
        push    cx
        push    dx calc_10:

; To calculate how long it would take to go idle, a read of the RTC
; and a keyboard status check are made and timed for long it takes. This
; time is then multiplied by IDLE_MAX, to give a time that is typical of how
; long it takes to do idle when the application is idle.

sti
        hlt
        call    read_timer              ; get time taken to do int16h
        push    ax                      ; save time mov     ah,READ_RTC             ; set function code to read RTC
        int     RTC_INT                 ; get time using ROS.
        mov     ah,1                    ; perform int16 kbd status check
        int     16h pop     bx                      ; start time in BX time now in AX ; The time taken should be time_now-start_time. However, the timer may
; have wrapped, since an INT8 could have occured in between. If this is the
; case we try again until we get a good reading.

sub     ax,bx                   ; is time_now > start_time
        jc      calc_10

; AX now contains time taken to perform an int 16H status check and a ROS
; call to read the RTC. IDLE_CNTDN value is calcuated thus:
;       IDLE_CNTDN=(read_RTC_time+int16_time)*(IDLE_MAX*2).

mov     cx,IDLE_MAX
        shl     cx,1                    ; multiply by 2
        mul     cx
```

```
        add     ax,100h             ; allow for round down
        and     ax,0ff00h           ; round down to a clean figure
        mov     IDLE_CNTDN,ax       ; Time it should take to idle pop     dx
        pop     cx
        pop     bx
        ret ;------------------------------------------------------------------------;
Module bcd2bin
; ==============
;
; entry
;       AL=BCD value.
; exit
;       AL=binary equivalent of BCD.
; function
;       This routine is called by set_tick, and converts the BCD value in AL
; into a binary equivalent and placing the result in AL.

bcd2bin:

push    bx
        mov     bl,0                ; start off without tens
bcd2bin2:
        cmp     al,10h              ; check if more tens
        jb      bcd2bin3            ; all tens done
        sub     al,10h              ; else subtract 10 in BCD
        add     bl,10               ; ...and add it in binary
        jmps    bcd2bin2            ; repeat for all tens
bcd2bin3:                           ; AL = ones, BL = tens
        add     al,bl               ; AL = binary value
        pop     bx                  ; restore BX
        ret RCODE   ends                        ; end of ROM device driver code
;------------------------------------------------------------------------
; This code from hereon is only used during inititlisation and is discarded
```

```
; after INIT in an installable system.
;------------------------------------------------------------;
ICODE    segment public word 'ICODE'    ; initialization code Assume  CS:CGROUP, DS:CGROUP, ES:CGROUP, SS:Nothing even                            ; start this on a word boundary
reusable:
IFDEF DDRIVER
sign_on          db       'IDLE86.SYS R1.03 installed.',CR,LF
                 db       EOM
ENDIF ;------------------------------------------------------------;
Module INIT
; ===========
;
; entry
;        DS= $IDLE$ data segment
; exit
;        $IDLE$ initialised
; function
;        This routine initialises the $IDLE$ driver.
;
init    proc    far
        pushx   <ax, bx, cx, dx, si, di, ds, es>
        les     bx, req_ptr             ; get request header
        call    dd_init                 ; call device initialization
        mov     RH_STATUS, ax           ; return "general failure"
        popx    <es, ds, di, si, dx, cx, bx, ax>
        ret
init    endp
;------------------------------------------------------------;
Module DD_INIT
; =============
;
; entry
;        DS -> $IDLE$ data segment
```

```
;       ES:BX -> device header
; exit
;       AX=0 for okay, else error code.
; purpose
;       To initialise the device driver and process any cmd line parameters. ;
dd_init:        ; 0-initialize driver
        push    es
        push    bx
        mov     ax,CG:idle_intrpt
        mov     intrp_ptr,ax            ; set Interrupt entry ; This bit fixes up the CS part of the int8_vector and int16_vector.
        mov     ax,rom_cs_fixup
        mov     int16_cs_fixup,ax
        mov     int8_cs_fixup,ax
        mov     idle_cs_fixup,ax parse_ok:
IFDEF DDRIVER
; Tell the world that we are here.
        mov     dx,CG:sign_on
        mov     ah,MS_C_WRITESTR        ; print message
        int     DOS_INT                 ; call DR DOS ; Video update on event required ?
ENDIF
; Tell DOS how much of us is here.
IFNDEF DDRIVER
        mov     ax,endbios              ; get pointer to last resident byte ELSE
        mov     ax,CG:reusable          ; get pointer to last resident byte ENDIF
        les     bx,req_ptr              ; ES:BX -> request header
        mov     RH0_RESIDENT,ax         ; set end of device driver
        mov     RH0_RESIDENT+2,cs sub     ax,ax                   ; initialization succeeded
        pop     bx
        pop     es
        ret
```

```
inst_fail:
        mov     ax,RHS_ERROR+12         ; return "general failure"
        pop     bx
        pop     es
        ret
ICODE   ends
        end
```

<u>LISTING 3</u>

```
;;****************************************************
;----------------------------------------------------;
; NAME: IDLE.EQU
;----------------------------------------------------;
; Copyright (C) 1990 Digital Research Inc.  All rights reserved.
;----------------------------------------------------;

ALL_INTS                equ     00000000b
IDLE386_INSTALLED       equ     1234h   ; We are installed marker.
PARAM_BLOCK             equ     10h     ; offset in INT60h data area
IDLE386_ID              equ     18h     ; offset in INT60h data area
IDLE_INSTALLED          equ     1234h   ; We are installed marker.
KBD_INT_MASK            equ     11111101b
READ_RTC                equ     2h      ; read RTC ROS function handle.
SET_TIME                equ     2dh     ; set RTC DOS function handle.
TIMER_INT_MASK          equ     11111110b
TIMER_0_REG     equ     040h            ; first counter timer port
TIMER_1_REG     equ     041h
TIMER_2_REG     equ     042h
TIMER_CMND_REG          equ     043h    ; command port ; Error codes generated by device driver processing on IDLE86.ASM.
INVALID_CMD             equ     8103h   ; invalid device driver command
OUTPUT_ERR              equ     810Ah   ; error during dd_output
INVALID_FUNCTION        equ     81h ; Interrupt service routine numbers.
IDLE_DATA_INT           equ     60h     ; int 60h used for data
TIMER_INT               equ     8h      ; timer tick int 8h ISR number
USER_INT                equ     1ch     ; user tick int
RTC_INT                 equ     1ah     ; time of day services.
```

```
; H/W emulated ports
ACTIVITY_PORT           equ     0e0h        ; dummy I/O address for video status chk
IDLE_PORT               equ     0e1h        ; dummy I/O address for idle port
; equates associated with $idle$ Idle State Data Area.
DD_OUT_COUNT            equ     4           ; expected value in COUNT field.
IDLE_COMMAND            equ     0001h       ; Command Processor Active
IDLE_DOSFUNC            equ     0002h       ; DOS Function Called
IDLE_INT28              equ     0004h       ; INT28 Called ; data offsets in Idle State Data Area.
IDLE_STATE              equ     word ptr 00[di]
IDLE_COUNT              equ     word ptr 0[di]
IDLE_MAX                equ     word ptr 02[di]
IDLE_FLAGS              equ     word ptr 04[di]
IDLE_DRIVER             equ     dword ptr 06[di]
IDLE_DRIVER_OFF         equ     word ptr 06[di]
IDLE_DRIVER_SEG         equ     word ptr 08h[di]
INT28_DELAY             equ     word ptr 0Ah[di]
INT28_RELOAD            equ     word ptr 0Ch[di]
IDLE_INDOS              equ     word ptr 0Eh[di]
IDLE_CNTDN              equ     word ptr 10h[di]
IDLESTAT_ID             equ     word ptr 12h[di]
IDLE_MAX_DEF            equ     5           ; default setting
INT28_RELOAD_DEF        equ     5           ; defailt setting
IDLE_MAX_OFF            equ     02h
INT28_RELOAD_OFF        equ     0ch
IDLE_CNTDN_OFF          equ     10h IDLE_ON     equ     4000h       ; ReSet when Idle Checking Enabled
IDLE_INIT   equ     8000h       ; ReSet when $IDLE$ Loaded and Active
IDLE_ENABLE equ     IDLE_INIT + IDLE_ON ; $IDLE$ function handles.
PROC_IDLE               equ     1           ; current process idle
PROC_INT28              equ     2           ; current process idle via INT28
PROC_KEYIN              equ     3           ; keyboard read function iminent
PROC_DEVIN              equ     4           ; device read function iminent
```

LISTING 4

```
;;**********************************************************;
;----------------------------------------------------------;
; NAME: 1:DRMACROS.EQU
;----------------------------------------------------------;
; Copyright (C) 1990 Digital Research Inc.  All rights reserved.
;----------------------------------------------------------;

FALSE    equ   0
TRUE     equ   (not FALSE)

ifndef  ??Version       ;; Turbo Assembler always knows RETF
ifndef  retf            ;; some versions of MASM do as well
retf macro              ;; define far return macro for others
    db 0cbh
    endm
endif
endif jmps macro l
    jmp   short l
    endm pushx   macro regs
    irp   r,<regs>
    push  r
    endm
    endm popx macro regs
    irp   r,<regs>
    pop   r
    endm
    endm incx macro regs
    irp   r,<regs>
    inc   r
    endm
```

```
    endm decx macro regs
    irp   r,<regs>
    dec   r
    endm
    endm rb  macro count
    db count dup (?)
    endm rw  macro count
    dw count dup (?)
    endm rd  macro count
    dd count dup (?)
    endm
```

LISTING 5

```
;;*********************************************************;
;---------------------------------------------------------;
; NAME: I:REQHDR.EQU
;---------------------------------------------------------;
; Copyright (C) 1990 Digital Research Inc.  All rights reserved.
;---------------------------------------------------------;

CMD_INIT              equ 0    ; Initialize the Device Driver
CMD_MEDIA_CHECK       equ 1    ; Request Media Check
CMD_BUILD_BPB         equ 2    ; Build Drive BPB
CMD_INPUT_IOCTL       equ 3    ; IOCTL input
CMD_INPUT             equ 4    ; Input
CMD_INPUT_NOWAIT      equ 5    ; Non destructive input no wait
CMD_INPUT_STATUS      equ 6    ; Input status
CMD_INPUT_FLUSH       equ 7    ; Input flush
CMD_OUTPUT            equ 8    ; Output
CMD_OUTPUT_VERIFY     equ 9    ; Output with verify
CMD_OUTPUT_STATUS     equ 10   ; Output status
CMD_OUTPUT_FLUSH      equ 11   ; Output flush
```

```
CMD_OUTPUT_IOCTL   equ  12        ; IOCTL output
CMD_DEVICE_OPEN    equ  13        ; Device OPEN
CMD_DEVICE_CLOSE   equ  14        ; Device CLOSE
CMD_FIXED_MEDIA    equ  15        ; Removeable Media Check
CMD_GENERIC_IOCTL  equ  19        ; Generic IOCTL
CMD_GET_DEVICE     equ  23        ; Get the Logical Device
CMD_SET_DEVICE     equ  24        ; Set the Logical Device ; Generic Request Header Format RH_LEN       equ   es:byte ptr 0[bx]
RH_UNIT      equ   es:byte ptr 1[bx]
RH_CMD       equ   es:byte ptr 2[bx]
RH_STATUS    equ   es:word ptr 3[bx]
RHS_DONE     equ   0100h
RHS_BUSY     equ   0200h
RHS_RM       equ   0800h
RHS_ERROR    equ   8000h ;******
;* No longer safe to use - some device drivers trample on them....
;*
;* RH_STRATEGY   equ   es:dword ptr 5[bx]   ; Device Strategy Routine
;* RH_STRATOFF   equ   es:word ptr  5[bx]   ; Strategy Offset
;* RH_STRATSEG   equ   es:word ptr  7[bx]   ; Strategy Segment
;* RH_INTERRUPT  equ   es:dword ptr 9[bx]   ; Device Interrupt Routine
;* RH_INTOFF     equ   es:word ptr  9[bx]   ; Intterupt Offset
;* RH_INTSEG     equ   es:word ptr 11[bx]   ; Interrupt Segment
;*****

; Request header for initialization

RHO_NUNITS    equ   es:byte ptr 13[bx]
RHO_RESIDENT  equ   es:word ptr 14[bx]
RHO_BPBOFF    equ   es:word ptr 18[bx]
RHO_BPBSEG    equ   es:word ptr 20[bx]
RHO_DRIVE     equ   es:byte ptr 22[bx]
RHO_LEN       equ   23
```

; Request header for media check

```
RH1_MEDIA   equ   es:byte ptr 13[bx]    ; BDOS: current media byte
RH1_RETURN  equ   es:byte ptr 14[bx]    ; driver: return code (00, 01, FF)
RH1_VOLID   equ   es:dword ptr 15[bx]   ; driver: volume label address
RH1_LEN     equ   19
```

; Request header for "build BPB"

```
RH2_MEDIA   equ   es:byte ptr 13[bx]    ; BDOS or driver?
RH2_BUFFER  equ   es:dword ptr 14[bx]   ; BDOS: scratch buffer for driver use
RH2_BPB     equ   es:dword ptr 18[bx]   ; same as the following:
RH2_BPBOFF  equ   es:word ptr 18[bx]    ; driver: address of new BPB
RH2_BPBSEG  equ   es:word ptr 20[bx]
RH2_LEN     equ   22
```

; Request header for input/output

```
RH4_MEDIA       equ   es:byte ptr 13[bx]    ; BDOS: current media byte
RH4_BUFFER      equ   es:dword ptr 14[bx]   ; BDOS: disk transfer address
RH4_BUFOFF      equ   es:word ptr 14[bx]    ; BDOS: Buffer Offset
RH4_BUFSEG      equ   es:word ptr 16[bx]    ; BDOS: Buffer Segment
RH4_COUNT       equ   es:word ptr 18[bx]    ; BDOS: sector count
RH4_SECTOR      equ   es:word ptr 20[bx]    ; BDOS: starting sector
RH4_VOLID       equ   es:dword ptr 22[bx]   ; driver: volume if illegal disk change
RH4_BIGSECTOR   equ   es:dword ptr 26[bx]   ; BDOS: DOS 4 32-bit sector
RH4_BIGSECTORLO equ   es:word ptr 26[bx]
RH4_BIGSECTORHI equ   es:word ptr 28[bx]
if 0
; the DOS 4 way
RH4_LEN     equ   30
else
; the COMPAQ 3.31 way
RH4_LEN     equ   22        ; or 24 if big sectors
endif
```

; Request Header for Non-Destructive Input

```
RH5_CHAR     equ    es:byte ptr 13[bx]    ; Character Read from Device
RH5_LEN      equ    14

; Request Header for Device Open

RH13_LEN     equ    13

; Request Header for Device Close

RH14_LEN     equ    13

; Request header for generic IOCTL

RH19_CATEGORY equ   es:word ptr 13[bx]    ; BDOS: major/minor function number
RH19_MAJOR   equ    es:byte ptr 13[bx]    ; BDOS: Major Function Number
RH19_MINOR   equ    es:byte ptr 14[bx]    ; BDOS: Minor Function Number
RH19_SI      equ    es:word ptr 15[bx]    ; BDOS: User SI
RH19_DI      equ    es:word ptr 17[bx]    ; BDOS: User DI
RH19_GENPB   equ    es:dword ptr 19[bx]   ; BDOS: extra parameters
RH19_LEN     equ    23

RQ19_SET        equ    40h       ; set device parameters
RQ19_GET        equ    60h       ; get device parameters
RQ19_WRITE      equ    41h       ; write tracks
RQ19_READ       equ    61h       ; read tracks
RQ19_FORMAT     equ    42h       ; format tracks
RQ19_VERIFY     equ    62h       ; verify tracks RQ19_PRP_START  equ    4Ch       ; start of codepage prepare
RQ19_PRP_END    equ    4Dh       ; end of codepage prepare
RQ19_SELECT     equ    4Ah       ; select code page
RQ19_QRY_SEL    equ    6Ah       ; query selected code page
RQ19_QRY_PRP    equ    6Bh       ; query prepared code page(s)
RQ19_DSP_SET    equ    5Fh       ; set display information
RQ19_DSP_GET    equ    7Fh       ; get display information ; Request header for get/set drive
```

```
RH24_DRIVE equ    es:byte ptr 13[bx]    ; BDOS: logical drive to set
RH24_CMD   equ    es:byte ptr 14[bx]    ; BDOS: Command Code
RH24_STATUS  equ  es:word ptr 15[bx]    ; BDOS: Status
RH24_RESVD equ    es:dword ptr 17[bx]   ; BDOS: Reserved
RH24_LEN   equ    21 if 0
                                        ; the DOS 4.0 way
RH_SIZE    equ    30                    ; maximum size of request header
else
                                        ; the COMPAQ 3.31 way
RH_SIZE    equ    28                    ; maximum size of request header
endif
```

LISTING 6

```
;;**********************************************************;
;----------------------------------------------------------;
; NAME: I:DRIVER.EQU
;----------------------------------------------------------;
; Copyright (C) 1990 Digital Research Inc.  All rights reserved.
;----------------------------------------------------------;

DH_NEXT     equ   es:dword ptr 0        ; Dword Pointer to Next DEV
DH_NEXTOFF  equ   es:word ptr 0         ; Offset of next device
DH_NEXTSEG  equ   es:word ptr 2         ; Segment of next device
DH_ATTRIB   equ   es:word ptr 4         ; device attribute bits
DH_STRATEGY equ   es:word ptr 6         ; offset of strategy entry
DH_INTERRUPT equ  es:word ptr 8         ; offset of interupt entry
DH_NAME     equ   es:byte ptr 10        ; 8-BYTE device name DA_CHARDEV  equ   8000h                 ; 1=character device, 0=block device
DA_IOCTL    equ   4000h                 ; device supports IOCTL string I/O
DA_NONIBM   equ   2000h                 ; dosen't require FAT for login
DA_OTILBSY  equ   2000h                 ; supports "output until busy"
DA_REMOVE   equ   0800h                 ; supports "removable media" check
DA_GETSET   equ   0040h                 ; supports 3.2 level functionality
DA_SPECIAL  equ   0010h                 ; fast console ouput via INT29h
DA_ISCLK    equ   0008h                 ; device is current clock device
DA_ISNUL    equ   0004h                 ; device is NUL device (reserved)
DA_BIGDRV   equ   0002h                 ; supports > 65535 sector per drive
```

```
DA_ISCOT    equ    0002h    ; device is standard output device

DA_ISCIN    equ    0001h    ; device is standard input device

FASTCON_INT    equ    29h    ; fast console output interrupt
```

While the invention has been particularly shown and described with reference to preferred embodiments thereof, it will be understood by those skilled in the art that the foregoing and other changes in form and details may be made therein without departing from the spirit and scope of the invention.

What is claimed is:

1. An activity system in a computer where the computer executes programs involving multiple events with times between events and where the computer operates with multiple performance states comprising, monitoring means for monitoring a plurality of said multiple events to determine event frequency represented by an event frequency value proportional to the frequency of said plurality of said multiple events during the execution of the programs by the computer system, parameter means for establishing an event parameter, comparing means for comparing the event frequency with the event parameter to determine when the event frequency differs from the event parameter, switching means for switching the performance state of the computer when the event frequency differs from the event parameter.

2. The activity system of claim 1 wherein said switching means includes reswitch means for switching the performance state of the computer in response to a reswitch condition.

3. The activity system of claim 2 wherein said reswitch means switches the performance state of the computer in response to a time-out reswitch condition.

4. The activity system of claim 2 wherein said reswitch means switches the performance state of the computer in response to an external reswitch condition.

5. The activity system of claim 2 wherein said computer includes a central processing unit performing functions in response to interrupts, includes interrupt generating means for generating interrupts to said central processing unit and wherein said reswitch means switches the performance state of the computer in response to an interrupt irrespective of when the switching means switched the performance state.

6. The activity system of claim 1 wherein said computer performance states include a high-power state and a low-power state and said switching means switches to the low-power state when the event frequency differs from the event parameter.

7. The activity system of claim 1 wherein said computer performance states include a high-frequency state and a low-frequency state and said switching means switches to one of said states when the event frequency differs from the event parameter.

8. The activity system of claim 1 wherein said multiple events originate externally from said computer system whereby said event frequency is independent of the performance of said computer system.

9. The activity system of claim 8 wherein said multiple events originate from user input at input devices for the computer.

10. The activity system of claim 9 wherein said multiple events originate from user keystroke input at a keyboard device for the computer.

11. The activity system of claim 1 wherein, said monitoring means monitors the actual time between events as said event frequency, said parameter means establishes said event parameter as a maximum event time to elapse between events, said comparing means compares the actual time with the event time to determine when the event frequency differs from the event parameter by determining when the actual time is less than the event time.

12. The activity system of claim 11 wherein, said parameter means includes event setting means to set said event time as a variable as a function of the performance of the computer system.

13. The activity system of claim 11 wherein, said parameter means includes event setting means to set said event time as a variable as a function of inputs external to said computer system.

14. An activity system in a computer where the computer executes programs involving multiple events with times between events and where the computer operates with multiple performance states, wherein said computer includes a central processing unit performing functions in response to interrupts, includes interrupt generating means for generating interrupts to said central processing unit, and includes a real time clock comprising, monitoring means for monitoring a plurality of said multiple events to determine event frequency during the execution of the programs by the computer system, said monitoring means including, interrupt timer means for monitoring an interrupt time as the time taken to perform an interrupt in the computer system, clock timer means for monitoring a clock time as the time taken to perform a read of the real-time clock, parameter means for establishing an event parameter as an event time, and including means for setting said event time as a function of the sum of the clock time and the interrupt time, comparing means for comparing the event frequency with the event parameter to determine when the event frequency differs from the event parameter, switching means for switching the performance state of the computer when the event frequency differs from the event parameter.

15. The activity system of claim 14 wherein said computer includes memory means for storing kernel code for said monitoring means in a kernel location and memory means for storing driver code for said parameter means in a driver location.

16. The activity system of claim 15 wherein said computer includes memory means for storing state information for use by said monitoring means and said parameter means for transferring information between said kernel code and said driver code.

17. An activity system in a computer system where the computer system includes an operating system for controlling operations of the computer when the computer executes programs involving multiple events with times between events and where the computer operates with multiple performance states comprising,
    monitoring means for monitoring a plurality of said multiple events to determine event frequency represented by an event frequency value proportional to the frequency of said plurality of said multiple events during the execution of the programs by the computer system,
    parameter means under control of the operating system for establishing an event parameter,
    comparing means under control of the operating system for comparing the event frequency with the event parameter to determine when the event frequency differs from the event parameter,
    switching means for switching the performance state of the computer when the event frequency differs from the event parameter,
    reswitch means for switching the performance state of the computer in response to a reswitch condition.

18. The activity system of claim 17 wherein said computer includes memory means for storing said operating system and wherein said operating system includes kernel code for said monitoring means and driver code for said parameter means.

19. The activity system of claim 18 wherein said computer includes memory means for storing state information for use by said kernel code and said driver code for transferring information between said monitoring means and said parameter means.

20. The activity system of claim 17 wherein,
    said monitoring means monitors the actual time between events as said event frequency,
    said parameter means establishes said event parameter as a maximum event time to elapse between events,
    said comparing means compares the actual time with the event time to determine when the event frequency differs from the event parameter by determining when the actual time is less than the event time.

21. The activity system of claim 20 wherein,
    said parameter means includes event setting means to set said event time as a variable as a function of the performance of the computer system.

22. The activity system of claim 21 wherein said computer includes a central processing unit performing functions in response to interrupts, includes interrupt generating means for generating interrupts to said central processing unit, and includes a real time clock and wherein,
    said monitoring means includes,
        interrupt timer means for monitoring an interrupt time as the time taken to perform an interrupt in the computer system,
        clock timer means for monitoring a clock time as the time taken to perform a read of the real-time clock,
    said event setting means includes, means for setting said event time as a function of the sum of the clock time and the interrupt time.

23. The activity system of claim 17 including means for counting system time at different rates for different performance states and wherein said computer includes a real time clock for counting real time, said activity system including means for updating said system time with said real time as a function of switching performance states.

24. The activity system of claim 17 including means for specifying said reswitch condition.

25. The activity system of claim 17 wherein said computer includes a keyboard having keyboard activity and wherein said reswitch means includes means for specifying said reswitch condition as a function of keyboard activity.

26. The activity system of claim 17 wherein said computer includes a real time clock for establishing real time and wherein said reswitch means includes means for specifying said reswitch condition as a function of a real time value.

27. The activity system of claim 17 wherein said computer system is adapted to execute an application program and wherein said reswitch means includes means for specifying said reswitch condition as a function of a command from said application program.

28. An activity system in a computer system where the computer system includes an operating system for controlling operations of the computer when the computer executes programs involving multiple events with times between events and where the computer operates with a low performance state and a high performance state comprising,
    monitoring means for monitoring a plurality of said multiple events to determine event frequency represented by an event frequency value proportional to the frequency of said plurality of said multiple events during the execution of the programs by the computer system,
    parameter means under control of the operating system for establishing an event parameter,
    comparing means under control of the operating system for comparing the event frequency with the event parameter to determine when the event frequency differs from the event parameter,
    switching means for switching the performance state of the computer from the high performance state to the low performance state when the event frequency differs from the event parameter,
    reswitch means for switching the performance of the computer from the low performance state to the high performance state in response to a reswitch condition.

29. The activity system of claim 28 including reswitch means for setting said reswitch condition.

30. The activity system of claim 29 wherein said reswitch means includes means for setting said reswitch condition as a function of multiple conditions.

31. The activity system of claim 30 wherein said computer includes a central processing unit performing functions in response to multiple types of interrupts, includes interrupt generating means for generating interrupts to said central processing unit, and includes means for selecting types of interrupts as said multiple conditions.

32. The activity system of claim 28 wherein said computer includes a central processing unit performing functions in response to interrupts, includes interrupt generating means for generating interrupts to said central processing unit, and includes a real time clock and wherein,
said monitoring means includes,
interrupt timer means for monitoring an interrupt time as the time taken to perform an interrupt in the computer system,
clock timer means for monitoring a clock time as the time taken to perform a read of the real-time clock,
said event setting means includes, means for setting said event time as a function of the sum of the clock time and the interrupt time.

33. An activity system method in a computer where the computer executes programs involving multiple events with times between events and where the computer operates with multiple performance states comprising,
monitoring means for monitoring a plurality of said multiple events to determine event frequency represented by an event frequency value proportional to the frequency of said plurality of said multiple events during the execution of the programs by the computer system,
establishing an event parameter,
comparing the event frequency with the event parameter to determine when the event frequency differs from the event parameter,
switching the performance state of the computer when the event frequency differs from the event parameter.

34. The activity system method of claim 33 wherein said switching step includes a reswitch step for switching the performance state of the computer in response to a reswitch condition.

35. The activity system method of claim 34 wherein said reswitch step switches the performance state of the computer in response to a time-out reswitch condition.

36. The activity system method of claim 34 wherein said reswitch step switches the performance state of the computer in response to an external reswitch condition.

37. The activity system method of claim 34 wherein said computer performs functions a central processing unit in response to interrupts, generates interrupts to said central processing unit and wherein said reswitch step switches the performance state of the computer in response to an interrupt.

38. The activity system method of claim 33 wherein said computer performance states include a high-power state and a low-power state and said switching step switches to the low-power state when the event frequency differs from the event parameter.

39. The activity system method of claim 33 wherein said computer performance states include a high-frequency state and a low-frequency state and said switching step switches to one of said states when the event frequency differs from the event parameter.

40. The activity system method of claim 33 wherein said multiple events originate externally from said computer system whereby said event frequency is independent of the performance of said computer system.

41. The activity system method of claim 40 wherein said multiple events originate from user input at input devices for the computer.

42. The activity system method of claim 41 wherein said multiple events originate from user keystroke input at a keyboard device for the computer.

43. The activity system method of claim 33 wherein, said monitoring step monitors the actual time between events as said event frequency,
said parameter step establishes said event parameter as a maximum event time to elapse between events,
said comparing step compares the actual time with the event time to determine when the event frequency differs from the event parameter by determining when the actual time is less than the event time.

44. The activity system method of claim 43 wherein, said parameter step includes an event setting step to set said event time as a variable as a function of the performance of the computer system.

45. The activity system method of claim 43 wherein, said parameter step includes an event setting step to set said event time as a variable as a function of inputs external to said computer system.

46. The activity system method of claim 33 wherein said computer includes a central processing unit performing functions in response to interrupts, includes interrupt generating means for generating interrupts to said central processing unit, and includes a real time clock and wherein,
said monitoring step includes,
an interrupt timer step for monitoring an interrupt time as the time taken to perform an interrupt in the computer system,
a clock timer step for monitoring a clock time as the time taken to perform a read of the real-time clock,
said event setting step includes, setting said event time as a function of the sum of the clock time and the interrupt time.

47. The activity system method of claim 33 wherein said computer includes memory for storing kernel code for said monitoring step in a kernel location and memory for storing driver code for said parameter step in a driver location.

48. The activity system method of claim 47 wherein said computer includes memory for storing state information for use by said monitoring step and said parameter step for transferring information between said kernel code and said driver code.

49. An activity system method in a computer system where the computer system includes an operating system for controlling operations of the computer when the computer executes programs involving multiple events with times between events and where the computer operates with multiple performance states comprising,
monitoring under control of the operating system a plurality of said multiple events to determine event frequency during the execution of the programs by the computer system,
establishing under control of the operating system an event parameter,
comparing under control of the operating system the event frequency with the event parameter to determine when the event frequency differs from the event parameter,
switching the performance state of the computer when the event frequency differs from the event parameter,
reswitching the performance state of the computer in response to a reswitch condition.

50. The activity system method of claim 49 wherein said computer includes memory step for storing said operating system and wherein said operating system includes kernel code for said monitoring step and driver code for said parameter step.

51. The activity system method of claim 50 wherein said computer includes memory for storing state information for use by said kernel code and said driver code for transferring information between said monitoring step and said parameter step.

52. The activity system method of claim 49 wherein, said monitoring step monitors the actual time between events as said event frequency,
said parameter step establishes said event parameter as a maximum event time to elapse between events,
said comparing step compares the actual time with the event time to determine when the event frequency differs from the event parameter by determining when the actual time is less than the event time.

53. The activity system method of claim 52 wherein, said parameter step includes event setting step to set said event time as a variable as a function of the performance of the computer system.

54. The activity system method of claim 53 wherein said computer includes a central processing unit performing functions in response to interrupts, includes interrupt generating means for generating interrupts to said central processing unit, and includes a real time clock and wherein,
said monitoring step includes,
monitoring an interrupt time as the time taken to perform an interrupt in the computer system,
monitoring a clock time as the time taken to perform a read of the real-time clock,
said event setting step includes, setting said event time as a function of the sum of the clock time and the interrupt time.

55. The activity system method of claim 49 including counting system time at different rates for different performance states and wherein said computer includes a real time clock for counting real time, said activity system method including the step of updating said system time with said real time as a function of switching performance states.

56. The activity system method of claim 49 including the step for specifying said reswitch condition.

57. The activity system method of claim 49 wherein said computer includes a keyboard adapted for having keyboard activity and wherein said reswitch step includes the step of specifying said reswitch condition as a function of keyboard activity.

58. The activity system method of claim 49 wherein said computer includes a real time clock for establishing real time and wherein said reswitch step includes the step of specifying said reswitch condition as a function of a real time value.

59. The activity system method of claim 49 wherein said computer system is adapted to execute an application program and wherein said reswitch step includes the step of specifying said reswitch condition as a function of a command from said application program.

60. An activity system method in a computer system where the computer system includes an operating system for controlling operations of the computer when the computer executes programs involving multiple events with times between events and where the computer operates with a low performance state and a high performance state comprising,
monitoring means for monitoring a plurality of said multiple events to determine event frequency represented by an event frequency value proportional to the frequency of said plurality of said multiple events during the execution of the programs by the computer system,
establishing under control of the operating system an event parameter,
comparing under control of the operating system the event frequency with the event parameter to determine when the event frequency differs from the event parameter,
switching the performance state of the computer from the high performance state to the low performance state when the event frequency differs from the event parameter,
reswitching the performance state of the computer from the low performance state to the high performance state in response to a reswitch condition.

61. The activity system method of claim 60 including a reswitch step for setting said reswitch condition.

62. The activity system method of claim 61 wherein said reswitch step includes the step of setting said reswitch condition as a function of multiple conditions.

63. The activity system method of claim 62 wherein said computer includes a central processing unit performing functions in response to multiple types of interrupts, includes interrupt generating means for generating interrupts to said central processing unit, and includes the step of selecting types of interrupts as said multiple conditions.

64. The activity system method of claim 60 wherein said computer includes a central processing unit performing functions in response to interrupts, includes interrupt generating means for generating interrupts to said central processing unit, and includes a real time clock and wherein,
said monitoring step includes,
monitoring an interrupt time as the time taken to perform an interrupt in the computer system,
monitoring a clock time as the time taken to perform a read of the real-time clock,
said event setting step includes, setting said event time as a function of the sum of the clock time and the interrupt time.

65. An activity system method in a computer system where the computer system includes an operating system for controlling operations of the computer when the computer executes programs involving multiple operating system events with times between events and where the computer operates with a low performance state and a high performance state comprising,
monitoring means for monitoring a plurality of said multiple operating system events to determine event frequency of said multiple events during the execution of the programs by the computer system,
establishing under control of the operating system an event parameter,
comparing under control of the operating system the event frequency with the event parameter to determine when the event frequency differs form the event parameter,
switching the performance state of the computer from the high performance state to the low performance state when the event frequency differs from the event parameter,
reswitching the performance state of the computer form the low performance state to the high performance state in response to a reswitch condition.

* * * * *